United States Patent
Le

(10) Patent No.: US 6,680,955 B1
(45) Date of Patent: Jan. 20, 2004

(54) TECHNIQUE FOR COMPRESSING A HEADER FIELD IN A DATA PACKET

(75) Inventor: Khiem Le, Coppell, TX (US)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/522,363

(22) Filed: Mar. 9, 2000

Related U.S. Application Data

(63) Continuation-in-part of application No. 09/377,913, filed on Aug. 20, 1999, now abandoned.

(51) Int. Cl.[7] .............................. H04J 3/18; H04J 3/06; H04J 3/00
(52) U.S. Cl. .................... 370/477; 370/516; 370/521
(58) Field of Search ................................ 370/229, 230, 370/230.1, 231, 235, 248, 249, 250, 252, 351–3, 389, 400, 468–474, 476–7, 503–4, 505–521

(56) References Cited

U.S. PATENT DOCUMENTS

| | | | |
|---|---|---|---|
| 6,300,887 B1 | * 10/2001 | Le | 341/60 |
| 6,404,746 B1 | * 6/2002 | Cave et al. | 370/262 |
| 6,498,791 B2 | * 12/2002 | Pickett et al. | 370/353 |
| 6,535,505 B1 | * 3/2003 | Hwang et al. | 370/352 |
| 6,542,931 B1 | * 4/2003 | Le et al. | 709/228 |
| 6,549,587 B1 | * 4/2003 | Li | 375/326 |
| 6,611,519 B1 | * 8/2003 | Howe | 370/386 |

OTHER PUBLICATIONS

Mamais et al., "Evaluation of the Casner–Jacobson Algorithm for Compressing the RTP/UDP/IP Headers", *1998 IEEE*, XP–002145714, pp. 543–546.
Casner et al., *Internet Draft*, Jul. 1998, "Compressing IP/UDP/RTP Headers for Low–Speed Serial Links", XP–002125101.

* cited by examiner

*Primary Examiner*—David Vincent
(74) *Attorney, Agent, or Firm*—Antonelli, Terry, Stout & Kraus, LLP

(57) ABSTRACT

A timer based header compression/decompression technique and timer and reference based technique are provided. A source generates a header field, such as an RTP time stamp. A packet including the header field is sent to a compressor which calculates a compressed header field based on the header field of the packet from the source and a jitter quantity. The compressed header field is calculated by calculating a jitter effect the network before the compressor has on the transmission of packets and calculating a jitter effect the network between the compressor and a decompressor has on the transmission of packets. The packet including the compressed header field is transmitted to a decompressor which includes a local timer. The decompressor decompresses the compressed header field by calculating an approximation of the header field based on the elapsed time since the arrival of a previous packet and the field value in the previous packet. The approximation of the header field is then corrected based on the compressed header field provided in the packet.

45 Claims, 12 Drawing Sheets

RTP PACKET FORMAT (e.g., VOICE SAMPLE)

UNCOMPRESSED RTP HEADER FORMAT

COMPRESSED RTP HEADER FORMAT

FIG. 9

| INFORMATION | CONTENT | SIZE |
|---|---|---|
| Init_info(n) | FULL IP/UDP/RTP HEADER; n IS IMPLICITLY SPECIFIED IN RTP SN | ABOUT 40 BYTES=320 BITS AT LEAST; SENT ON AIR INTERFACE |
| String_init(n) | C_SN, C_TS (IF TIMING IS NOT MAINTAINED FROM ONE STRING TO THE NEXT), p_size (UNLIKELY), TS_stride (UNLIKELY); n IS IMPLICITLY SPECIFIED IN C_SN | ABOUT 8 BITS IF ONLY C_SN, 12 BITS IF C_SN AND C_TS |
| HO_init_u(n) | FULL IP/UDP/RTP HEADER, BUT RTP TS REPLACED BY TS0_u, m_last_u, TS_stride_u, TS Timer_u, p_size_u; n IS IMPLICITLY SPECIFIED IN RTP SN | SLIGHTLY LARGER THAN FULL HEADER; CARRIED ON WIRELINE NETWORK, BETWEEN ANI_AD |
| HO_init_d(n) | P_size_d, and TS_stride_d, ALONG WITH THEIR GENERATION NUMBER | SIZE DEPENDS ON THE CODING OF p_size AND TS_stride; CARRIED ON WIRELINE NETWORK, BETWEEN ANI_AD |
| HO_sync_u(n) | C_SN, C_TS (LIKELY), p_size_u, TS_stride_u; n IS IMPLICITLY SPECIFIED IN C_SN | ABOUT 8 BITS IF ONLY C_SN, 12 BITS IF C_SN AND C_TS |
| HO_sync_d(n) | C_SN, C_TS (LIKELY), p_size_d, TS_stride_d; n IS IMPLICITLY SPECIFIED IN C_SN | ABOUT 8 BITS IF ONLY C_SN, 12 BITS IF C_SN AND C_TS |
| Ack(n) | | A FEW BITS |

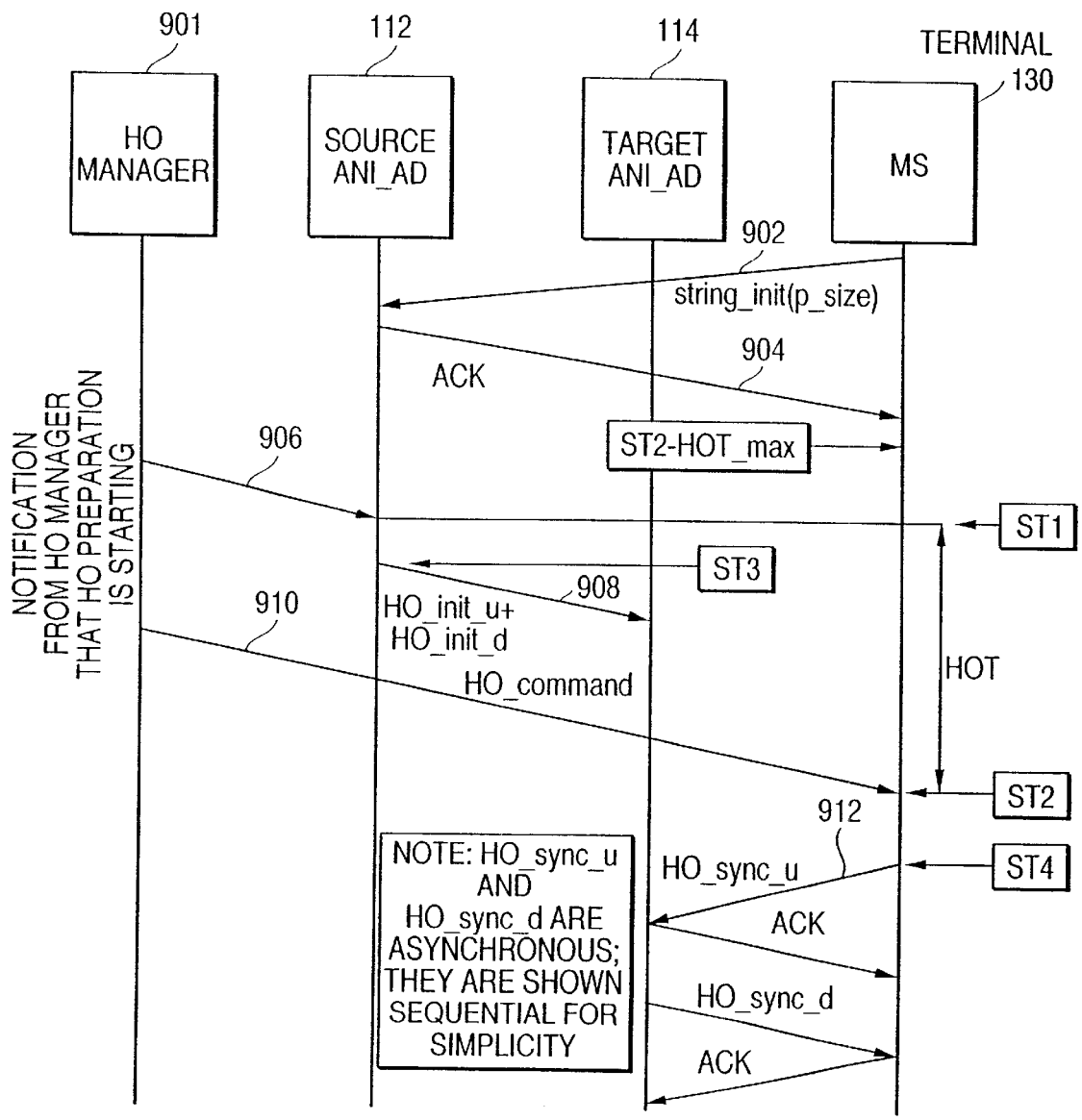

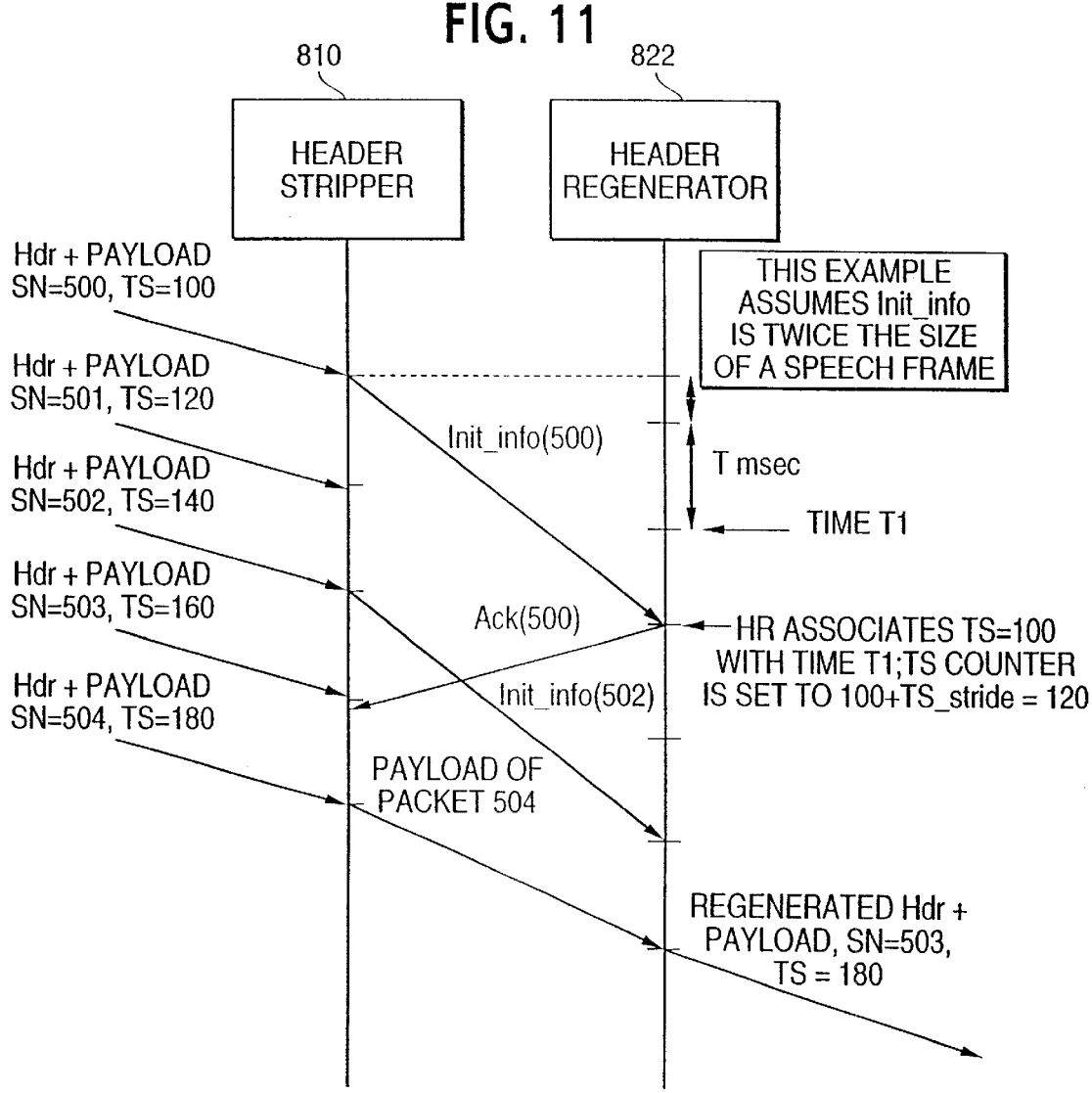

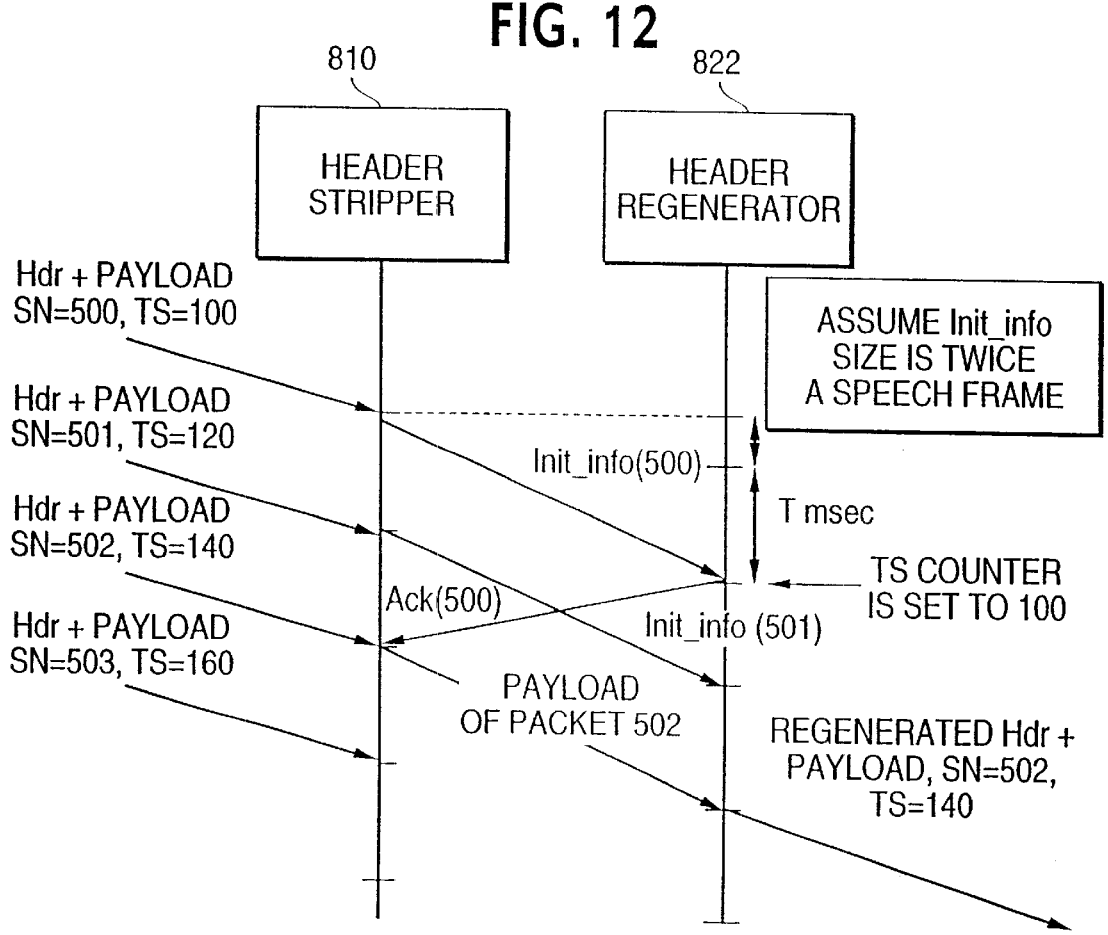

FIG. 13

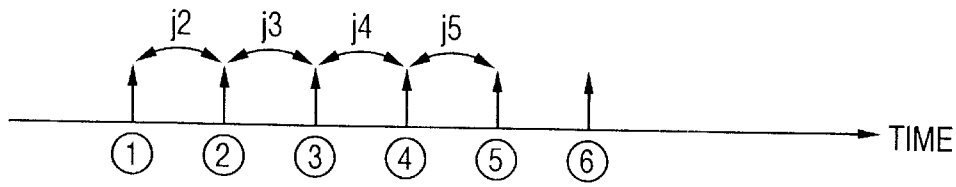

j2 = JITTER OF PACKET 2 WITH RESPECT TO 1
j3 = JITTER OF PACKET 3 WITH RESPECT TO 2
j4 = JITTER OF PACKET 4 WITH RESPECT TO 3
j5 = JITTER OF PACKET 5 WITH RESPECT TO 4  ← DONE AT PACKET 5
NETWORK JITTER FOR PACKET 2 = j2
NETWORK JITTER FOR PACKET 3 = j3
NETWORK JITTER FOR PACKET 4 = j4, etc.

FIG. 14

OPTION1

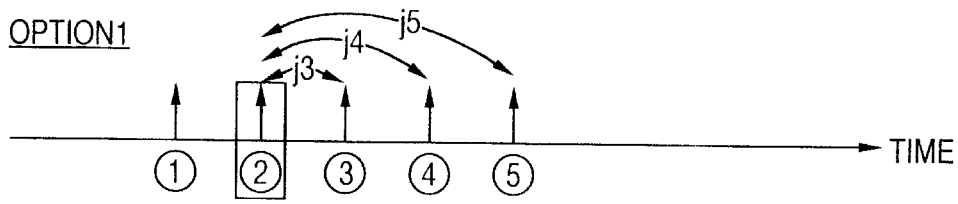

PACKET 2 IS THE REFERENCE.

N_JITTER(3, 2) = j3 = JITTER OF PACKET 3 WITH RESPECT TO REFERENCE
 ASSUME j3 = 2
N_JITTER(4, 2) = j4 = JITTER OF PACKET 4 WITH RESPECT TO REFERENCE
 ASSUME j4 = 3
N_JITTER(5, 2) = j5 = JITTER OF PACKET 5 WITH RESPECT TO REFERENCE
 ASSUME j5 = -1

BEFORE PKT 5: N_JITTER_MIN = 2   N_JITTER_MAX = 3
     AT PKT 5: N_JITTER_MIN = -1  N_JITTER_MAX = 3

N_JITTER_MAX_N_JITTER_MIN = 3 - (-1) = 4

MAX NETWORK JITTER = 4 FOR PACKET 5

OPTION 2

CALCULATE JITTER OF PACKET 5 WITH RESPECT TO 1: j(5,1) = 2 = N_JITTER (5,1)
CALCULATE JITTER OF PACKET 5 WITH RESPECT TO 2: j(5,2) = 3 = N_JITTER (5,2)
CALCULATE JITTER OF PACKET 5 WITH RESPECT TO 3: j(5,3) = 4 = N_JITTER (5,3)
CALCULATE JITTER OF PACKET 5 WITH RESPECT TO 4: j(5,4) = 7 = N_JITTER (5,4)
MAX NETWORK JITTER = 7 FOR PACKET 5

TECHNIQUE FOR COMPRESSING A HEADER FIELD IN A DATA PACKET

This is a continuation-in-part of application Ser. No. 09/377,913, filed Aug. 20, 1999 now abandoned for "A TECHNIQUE FOR COMPRESSING A HEADER FIELD IN A DATA PACKET" by Khiem LE, the contents of which are incorporated herein by reference.

CROSS REFERENCE TO RELATED APPLICATION

The present application is related to application Ser. No. 04/522,497, now U.S. Pat. No. 6,300,887 filed on the same as the present application for "AN EFFICIENT HANDOFF PROCEDURE FOR HEADER COMPRESSION" by Khiem LE, the contents of which are incorporated herein by reference.

BACKGROUND OF THE INVENTION

The present invention relates to a method and apparatus for compressing a header field in a data packet. More particularly, the present invention relates to a method and apparatus for compressing a header field of a data packet using a Timer and a Reference Based Scheme.

For Internet Protocol (IP) based real-time multimedia, Real-Time Transfer Protocol (RTP) protocol is predominantly used on top of User Datagram Protocol (UDP/IP. RTP is described in detail in RFC 1889. The size of the combined IP/UDP/RTP headers is at least 40 bytes for IPv4 and at least 60 bytes for IPv6. 40–60 bytes overhead per packet may be considered heavy in systems (e.g., such as cellular networks) where spectral efficiency is a primary concern. Consequently, a need exists for suitable IP/UDP/RTP header compression mechanisms. A current header compression scheme is described in RFC2508, which is able to compress the 40/60 byte IP/UDP/RTP header down to 2 or 4 bytes over point-to-point links. The existing header compression algorithms are based on the observation that most fields of the IP packet headers remain constant in a packet stream during the length of a session. Thus, it is possible to compress the header information by establishing a compression state (the full header information) at the de-compressor and by simply carrying minimal amount of header information from the compressor to the de-compressor.

RFC2508 is based on the idea that most of the time, the RTP fields that change from one packet to the next, such as the RTP time stamp, can be predicted by linear extrapolation. Essentially the only information that has to be sent is a sequence number, used for error and packet loss detection (as well as a context ID). When the sender determines that linear extrapolation cannot be applied to the current packet, a first order difference information with respect to the immediately preceding packet is sent. To initiate the session, a full header is sent. In addition, when the receiver determines that there is packet loss (as detected by a sequence number incrementing by more than 1) the receiver will explicitly request the sender to transmit the full header in order to allow a re-synchronization.

However, the header compression defined in RFC2508 is not well suited for certain environments (such as cellular or wireless environments), where bandwidth is at a premium and errors are common. In the RFC2508 header compression scheme, the RTP time stamp is assumed to have most of the time a linearly increasing pattern. When the header conforms to the pattern, essentially only a short sequence number is needed in the compressed header. When the header does not conform to the to pattern, the difference between the RTP time stamps of the current header and of the previous one is sent in the compressed header. Further optimization is possible by using a coding table. This approach has three drawbacks. The first one is that it is not robust to errors, as the loss of the previous header will invalidate the decompression of the current header. The second one is that RTP time stamp differences or jumps can be very large, thus overflowing the coding look up table. For example, if the medium is voice, such large differences can be caused by a silence interval. The third one is that the size of the resulting encoded difference is variable, which makes it more difficult to predict and manage the bandwidth to be allocated.

Therefore, there is a need for a header compression scheme that can accommodate an arbitrary jump in the value of the field (e.g., in the value of the RTP time stamp), yields a more consistent or constant size, and is more robust to errors.

SUMMARY OF THE INVENTION

According to an embodiment of the present invention, a timer based header decompression technique is provided. An RTP source generates a header field, such as an RTP time stamp. The time stamp is sent over a network to a compressor. At the compressor, a jitter reduction function (JRF) is used to determine whether the jitter of the received time stamp (header) is excessive. If the jitter is excessive, the packet is discarded. Otherwise, the compressor calculates a compressed header field (compressed time stamp) based on the RTP time stamp and an initial value of the time stamp. The compressed time stamp represents jitter which is calculated as an effect the network between the source and the decompressor has on the transmission of packets. The calculated jitter is a cumulation of network jitter representing the effect the network between the source and the compressor has on the transmission of packets and radio jitter representing the effect the network between the compressor and decompressor has on the transmission of packets. It should be noted that the term "network" as used herein is intended to be a broad term so as not to preclude, for example, radio links in a wireless telecommunications network. The RTP packet, including the compressed time stamp, is then transmitted over a link or network to a decompressor.

The decompressor decompresses the compressed time stamp by first calculating an estimate or approximation of the time stamp based on the current value of a timer located at the terminal (i.e., based on elapsed time). The approximation of the time stamp is then refined or corrected based on the compressed time stamp provided in the packet header. In this manner, the time stamp for the current packet (header) is regenerated based on a local timer and a compressed time stamp provided in the current header. The packet and the regenerated time stamp are then provided to an RTP endpoint for processing.

The timer-based scheme of the present invention includes several advantages. The term "timer based scheme" as used herein is inclusive of the timer based scheme using a compressed time stamp and the timer and reference based scheme as disclosed herein. The size of the compressed time stamp (or other header field) is constant and small. Furthermore, the size does not change as a function of the length of interval of silence. No synchronization is required between the timer process at the RTP source (generating the time stamp) and the timer at the decompressor process. Also, this technique is robust to errors, as the partial time stamp information in the compressed header is self contained and only needs to be combined with the decompressor timer value to yield the full RTP time stamp value. Loss or corruption of a header will not invalidate subsequent compressed headers.

A second embodiment of the present invention provides a header-stripping scheme in which the header (e.g., including the RTP time stamp) is stripped or removed from the RTP packet prior to transmission. A header stripper and a header generator are connected through a circuit like connection (e.g., circuit or virtual circuit) or an essentially constant bit rate channel. After initialization, the header stripper strips or removes the header (including removing the time stamp and sequence number) from each packet and then transmits the headerless packets to the header regenerator. To eliminate packet jitter at the header stripper, the packets can be transmitted at a time spacing according to the RTP time stamp (TS) in the header. Therefore, in this embodiment, the time stamp is not explicitly provided in the RTP packet (nor even a compressed time stamp). Rather, timing information is implicitly provided to the to the header regenerator based upon an essentially constant bit-rate channel between the header stripper and regenerator. The essentially constant bit-rate channel can be provided in several different ways.

In this second embodiment, after initialization occurs (e.g., providing the initial sequence number and time stamp to the header regenerator) the header regenerator can regenerate the time stamps for sequential packets by incrementing a local time stamp counter by TS_stride every T msecs, and regenerate the packet sequence numbers by incrementing a local SN counter by 1 every packet duration. These fields can be regenerated based only on a local timer or counter due to the essentially constant bit rate channel provided between the header stripper and header regenerator in which no packet jitter is introduced. Therefore, after initialization, these header fields can be regenerated at the header regenerator with reference only to a local clock.

However, one or more basic discontinuity events (e.g., change in packet size or TS_stride, a non-linear shift in the time stamp, etc.) may occur which, if not addressed, could likely invalidate the header-stripping approach which relies only on a local timer or clock for field regeneration. A header string is a sequence of packet headers having known or linearly predictable fields. The transition from one string to another can be caused by any of several discontinuity events. When this occurs, the header stripper identifies discontinuity event and sends updated header information related to the event to the header regenerator to allow time stamp and sequence number regeneration to continue. A similar technique of providing updated header information can be used when there is a handover as well.

BRIEF DESCRIPTION OF THE DRAWINGS

The present invention will be more apparent from the following detailed description, when taken in conjunction with the accompanying drawings, in which:

FIG. 9 is a table illustrating information which may be provided in messages according to an example embodiment of the invention;

FIG. 10 is a diagram illustrating a handover process according to an example embodiment of the present invention;

FIG. 11 is a diagram illustrating an initialization for in-band according to an example embodiment of the invention;

FIG. 12 is a diagram illustrating an initialization for out-of-band according to an example embodiment of the invention;

FIG. 13 is a diagram illustrating the steps of calculating network jitter according to a first method of the present invention;

FIG. 14 is a diagram illustrating the steps of calculating network jitter according to a second method set forth as Option 1 of the present invention.

DETAILED DESCRIPTION OF THE INVENTION

I. Timer Based Scheme Using A Compressed Time Stamp

A. Architecture

Figure 1:
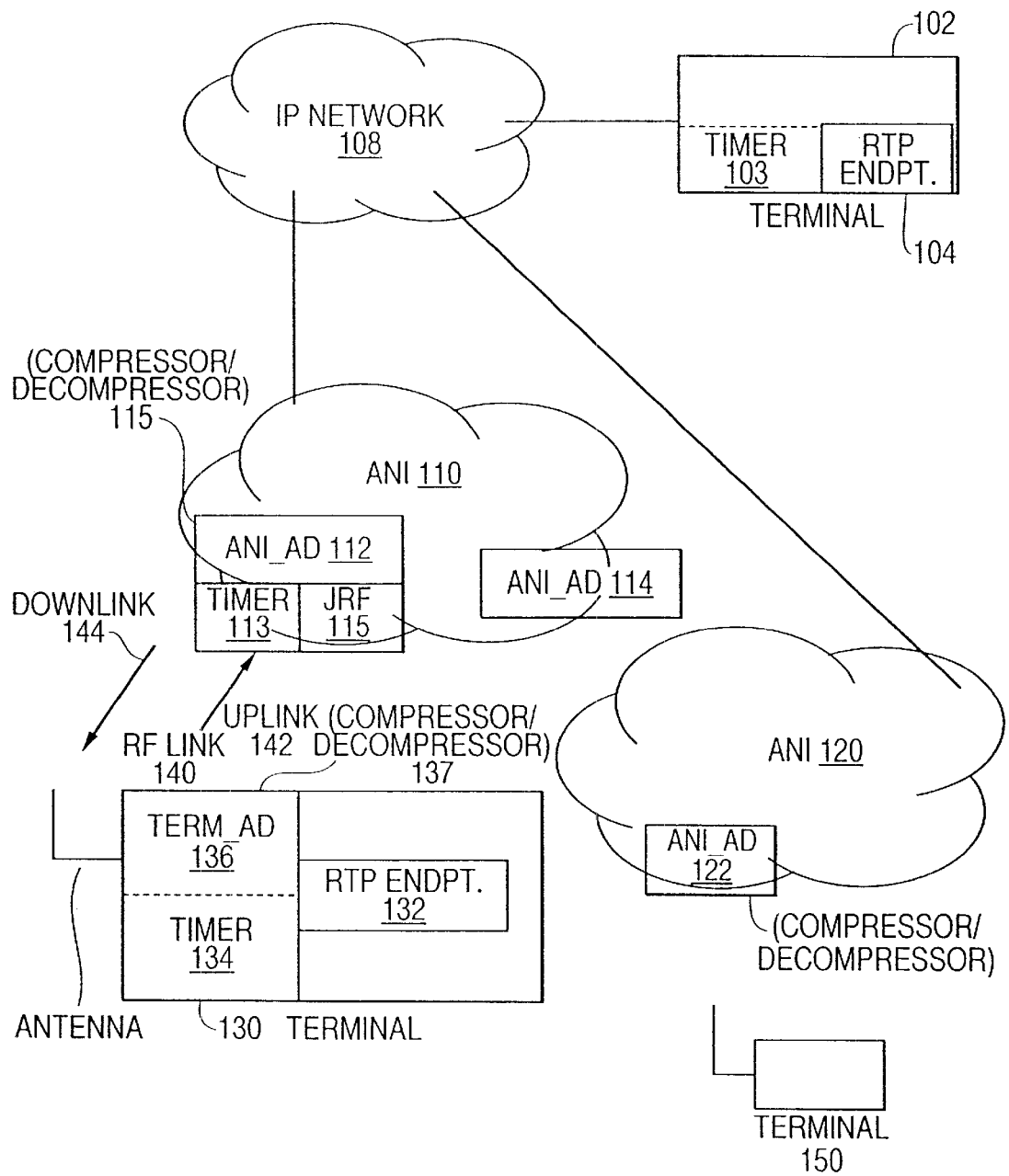
FIG. 1 is a block diagram illustrating an system according to an example embodiment of the present invention.

FIG. 1 is a block diagram illustrating an system according to an example embodiment of the present invention. A terminal 102 is connected to a IP network 108. Terminal 102 may be a personal computer or the like running RTP/UDP/IP, and providing packetized voice samples in RTP packets for transmission over network 110. Terminal 102 includes a RTP endpoint 104 which identifies this terminal (e.g., including IP address, port number, etc.) as either a source or destination for RTP packets. IP network is provided as an example, however, other types of packet switched networks or the like can be used instead. It should be noted that the term "network" as used herein is intended to be a broad term so as not to preclude, for example, radio links in a wireless telecommunications network. Terminal 102 also includes a local timer 103 for generating a time stamp.

An access network infrastructure (ANI) 110 is connected to IP network 108. A wireless terminal 130 is coupled via radio frequency (RF) link 140 to ANI 110. The wireless terminal 130 as described herein could, for example, be a wireless compressor or a wireless decompressor depending on its environment. This particularly occurs when the source of the packets or the destination of the packets are separate from the wireless terminal 130. RF link 140 includes an uplink 142 (from terminal 130 to ANI 110) and a downlink 144 (from ANI 110 to terminal 130). ANI 110 interfaces one or more wireless (or radio frequency) terminals (including terminal 130) in a region to IP network 108, including converting between wireline signals (provided from IP network 108) and wireless or RF signals (provided to or from terminal 130). Thus, ANI 110 allows RTP packets received from IP network 108 to be sent over RF link 140 to wireless terminal 130, and allows RTP packets from terminal 130 to be sent over IP network 108 to another terminal, such as terminal 102.

According to an embodiment of the present invention, ANI 110 includes one or more ANI adapters (ANI_AD), such as ANI_AD 112 and ANI_AD 114, each of which preferably includes a timer. Each ANI_AD performs header compression (prior to downlink transmission) and decompression (after uplink transmission). Headers (or one or more header fields, such as a time stamp) for RTP packets received from IP network 108 are compressed by ANI_AD 112 prior to transmission to terminal 130 over downlink 142, and packet headers received from terminal 130 are decompressed by ANI_AD 112 before transmission to IP network 108. Therefore, each ANI_AD may be considered to be a compressor/decompressor 115. Each ANI_AD may interface terminals located in a specific or different area within the region to IP network 108. ANI_AD 112 includes a timer 113 for implementing a timer-based decompression technique. ANI_AD 112 also includes a jitter reduction function (JRF) 115 which operates to measure the jitter on packets (or headers) received over the network 108 and discard any packets/headers which have excessive jitter.

Additional ANIs, such as ANI 120, may be provided for interfacing other terminals located in additional regions to IP network 108. ANI 120 similarly includes one or more ANI_ADs, such as ANI_AD 122 (FIG. 1). Each ANI_AD includes a timer and a JRF.

Terminal 130 includes an RTP endpoint 132 which is a source and/or destination (receiver) for RTP packets. Terminal 130 includes a terminal adapter (term_AD) 136 which performs header compression (for packets to be transmitted uplink 142) and decompression (on packets received over downlink 144). Thus, terminal adapter (term_AD) may be considered to be a header compressor/decompressor 137, similar to the ANI_AD.

The terminal adapter (term_AD) 136 also includes a timer 134 (a receiver timer) for calculating an approximation (or estimate) of a RTP time stamp of a current header. The terminal adapter (term_AD) 136 then uses additional information in the RTP header to refine or correct the time stamp approximation. According to an embodiment of the invention, the time stamp approximation is corrected or adjusted based upon a compressed time stamp provided in the RTP header. In this manner, a local timer and a compressed time stamp can be used to regenerate the correct time stamp for each RTP header. Other terminals (such as terminal 150) may be provided, each including its own RTP endpoint, terminal adapter and timer.

The configuration shown in FIG. 1 is provided merely as an example and the invention is not limited thereto. Rather, FIG. 1 simply provides one example where RTP data is transmitted over a data link or system (such as wireless link 140) where bandwidth is at a premium and errors are not uncommon. The present invention is not limited to a wireless link, but is applicable to a wide variety of links (including wireline links, etc.).

One example application or system where the timer based header compression and decompression scheme may be useful is where Voice over IP (or IP-telephony) packets are transmitted over cellular systems. When VoIP is applied to cellular systems, it is important to minimize the overhead of the IP/UDP/RTP header due to the limited bandwidth of the wireless or air (RF) interface. In such a system for example, the ANI_AD would interface the IP network to a computer terminal running RTP/UDP/IP (e.g., terminal 130) and having a cellular or RF interface for receiving RTP packets over the wireless or RF link. This is merely one example application of to the compression/decompression technique of the present invention.

Figure 2:
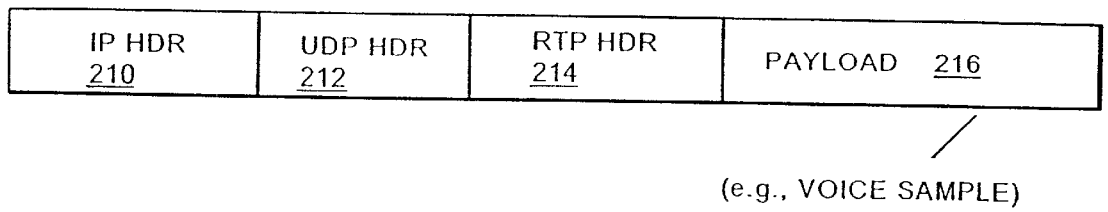
FIG. 2 is a diagram illustrating an uncompressed format of an RTP packet according to an embodiment of the present invention.

FIG. 2 is a diagram illustrating an uncompressed format of an RTP packet according to an embodiment of the present invention. As shown in FIG. 2, the uncompressed RTP packet includes an IP header, a UDP header 212, a RTP header 214 and a payload which could be a voice sample 216.

Figure 3:
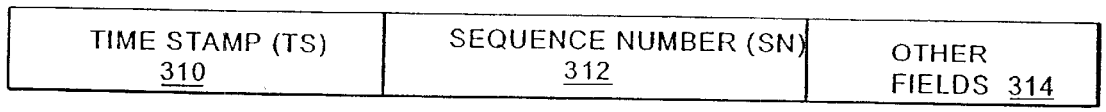
FIG. 3 is a diagram illustrating the uncompressed RTP header format according to an example embodiment of the present invention.

FIG. 3 is a diagram illustrating the uncompressed RTP header format according to an example embodiment of the present invention. As shown in FIG. 3, the uncompressed RTP header includes a time stamp (TS) 310, a sequence number (S.N.) 312 and some other fields 314. Due to the packet-switched nature of IP network 108, RTP packets can arrive out of order. The sequence number 312 is used at the RTP receiver or RTP destination (e.g., terminal 130, FIG. 1) to assemble the RTP voice samples in the correct order. However, the sequence numbers in the RTP packets will not reflect any non-linear change in the field (e.g., intervals of silence of the voice signal). Therefore, a time stamp (TS) 310 is provided to indicate the relative timing of each packet.

As noted above, there is some concern that the 40–60 byte header overhead supplied by the IP/UDP/RTP headers in each RTP packet is too large. In particular, a 4 byte RTP time stamp is particularly burdensome for RTP packets operating over low speed or limited bandwidth links (such as link 140). As a result, there is a need for a mechanism to effectively compress the RTP headers and particularly compress the time stamp field in the RTP header.

The header compression technique described in RFC 2508 initially sends a complete (uncompressed) RTP packet, including all fields to the RTP destination/receiver. Many of the fields of the headers during a connection are static, and thus, need not be transmitted after the initial packet is sent and received. For most packets, only the sequence number and the time stamp will change from packet to packet. According to RFC 2508, the non-static fields (e.g., time stamp and sequence number) are updated at the receiver by adding (fixed) first-order differences to the previous values of those fields stored at the receiver. For example, the sequence number of each received RTP packet will automatically be incremented by one for each packet. Additional jumps or changes (i.e., different from the first order difference) in the non-static fields must be separately transmitted to the receiver. Unfortunately, in RFC 2508, the loss of the previous header will invalidate the decompression at the receiver. Also, the size of the differences varies which makes it more difficult to manage and predict bandwidth using the compression technique of RFC.2508.

According to an embodiment of the present invention, a technique for header compression is provided that can be used to more effectively compress a RTP time stamp (or other field) of a packet header. According to an embodiment of the present invention, the compression scheme can accommodate an arbitrary jump in the RTP time stamp value, while yielding a constant size compressed RTP header (or constant size RTP time stamp).

Figure 4:
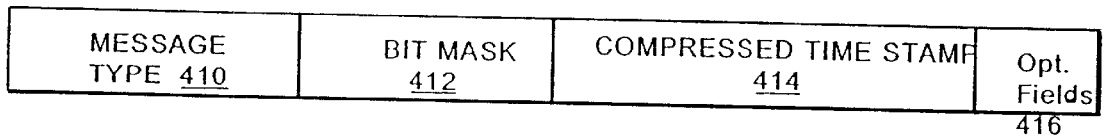
FIG. 4 is a diagram illustrating a compressed RTP header format according to an example embodiment of the present invention.

FIG. 4 is a diagram illustrating a compressed RTP header format according to an example embodiment of the present invention. As shown in FIG. 4, the compressed RTP header may consist of a message type 410 which indicates the type of message, a bit mask 412 which identifies the fields which are changing, and a compressed time stamp field 414. The message type 410 may indicate a compressed time stamp if a compressed time stamp is provided in the packet header. According to an embodiment of the present invention, the compressed time stamp field 414 includes the k least significant bits (lsbs) of a value which may indicate the time elapsed between packets. According to an embodiment of the invention, the compressed time stamp 414 may provide a portion (i.e., the k least significant bits) of a source counter value (or counter difference). The source counter may be used to generate the time stamp for each RTP packet header. Optional fields 416 can be used to provide updated or changed fields for those fields identified in the bit mask 412.

B. Overall Operation of Time Stamp Compression and Decompression

The compression and decompression of the RTP time stamp will be briefly described, according to an embodiment of the invention. According to an embodiment, an RTP packet is generated at an RTP endpoint (such as RTP endpoint 104 of terminal 102) and is addressed to another RTP endpoint. In this example, RTP endpoint 104 is the source of the one or more RTP packets to be sent to RTP endpoint 132 (the destination) of terminal 130. The RTP packet header includes a time stamp, which is generated at the RTP source (e.g., at terminal 102) based on a wallclock.

The RTP packet is routed over the IP network 108 to the ANI_AD 112 of ANI 110. The ANI_AD 112 compresses one or more fields in the header(s) of the RTP packet. In particular, the ANI_AD compresses the RTP time stamp 310 (FIG. 3) into a compressed time stamp 414 (FIG. 4). Other fields in the header may be compressed by removing them or using some other technique. The RTP packet, including the compressed time stamp 414, is then transmitted over the downlink 144 of RF link 140 to terminal 130.

Upon receipt of the RTP packet with compressed header (i.e., compressed time stamp 414), the terminal adapter (term_AD) 136 of terminal 130 decompresses the time stamp value. The terminal adapter 136 decompresses the compressed time stamp 414 by first calculating an estimate or approximation of the time stamp based on the current value of timer 134. The approximation of the time stamp is then refined or corrected based on the compressed time stamp 414 provided in the packet header. In this manner, the time stamp for the current packet (header) is regenerated based on a local timer (timer 134) and a compressed time stamp provided in the current header. The other fields of the packet header (such as the sequence number) may also be regenerated. The packet and the regenerated time stamp are then provided to the RTP endpoint 132 for processing. The RTP endpoint 132 then replays the voice samples in the appropriate order (as specified by the sequence numbers) and having the appropriate timing as specified by the regenerated time stamps (e.g., to account for any intervals of silence).

The ANI_AD 112 may also receive compressed headers (including a compressed time stamp) over RF link 140, and decompress the time stamp using the timer-based decompression technique described above. Therefore, the ANI_AD 112 may typically include a timer to allow the ANI_AD to decompress the compressed time stamp as described above. Similarly, the term_AD 136 of terminal 130 may also compress the time stamp of the RTP packet prior to transmission of the RTP packet over RF link 140 to ANI 110. To simplify the explanation of the example embodiments of the invention, the majority of the description will be directed to the downlink path 144. According to an embodiment of the invention, RTP packets may be transmitted in both directions (uplink 142 and downlink 144). Thus, both ANI_AD 112 of ANI 110 and term_AD of terminal 130 may operate as a time stamp compressor (for transmission of the header/packet over the RF link) and a decompressor (after receipt of a compressed header received over RF link 140).

C. Example Embodiments of Time Stamp Compression and Decompression

Example embodiments of time stamp compression and decompression will be briefly described. It is assumed that the data in the RTP packets is voice data. The following variables and formulas are defined only to assist in explaining some of the features of the present invention, but the invention is not limited thereto. Also, the present invention is not limited to systems which use the same or similar types of variables, and is not limited to systems which perform the specific calculations described below. The variables and calculations are merely provided as an example embodiment of the invention.

T—is the time spacing between RTP speech samples. (If there is one speech sample provided in each RTP packet, then T is also the spacing between RTP packet headers).

TS—time stamp

TS_stride—the RTP time stamp is incremented by TS_stride every T msec. In other words, the RTP time stamp increases by TS_stride for every new RTP packet. TS_stride is a constant (e.g., 100) that depends on the voice codec. TS_stride is provided to the receiver (terminal 130) and the ANI_AD 112.

TS0—RTP time stamp of the first header of a session received at the RTP receiver. The first header of a session is considered a synchronization header because it is used for synchronization. TS0 is an initial value of the RTP time stamp provided to both the compressor (e.g., ANI_AD 112) and the decompressor (e.g., term_AD 136) at the beginning of the session (for synchronization). According to an embodiment, the ANI_AD and term_AD are initialized or synchronized by receiving an RTP packet with an uncompressed header (including an uncompressed time stamp providing TS0). According to an embodiment of the present invention, the timer-based decompression technique requires providing an initial time stamp TS0 (e.g., through an initial or synchronization header that is uncompressed) to the time stamp compressor (i.e., ANI_AD 112) and to the decompressor (i.e., term_AD 136) before compressed headers can be properly decompressed (i.e., so the decompressor can correctly regenerate the time stamp).

RTP time stamp of packet header m (generated at time m*T msec)=TS0+TS_stride*m. This assumes that there is one header for each voice sample. As shown in the examples described below, this formula can be extended for the case of multiple voice samples (e.g., 3 voice samples) per packet header.

m—an integer that indicates the number of speech samples that have been sent. m is reset or cleared to 0 at the beginning of the session. m is proportional to (or indicates) the amount of time that has elapsed since the beginning of the session. m is incremented by 1 every T msecs.

TS_current=TS0 +m_current*TS_stride; The current time stamp for the current packet header.

Receiver timer—the timer at the RTP receiver (or RTP destination), such as the timer 134 of terminal 130. The local receiver timer is typically free running and will not be reset at the beginning of a session. Rather, elapsed time at the RTP receiver between receipt of two packet headers can be obtained by subtracting the timer value of the current header from the receiver timer value when the previous packet header was received. By allowing the receiver timer to be free running, one receiver timer can be shared by many flows or sessions. Alternatively, the receiver timer can be reset at the beginning of each session. Resetting or clearing a receiver timer at the beginning of a session (i.e., upon receipt of initialization header) would require a dedicated receiver timer (timer process) for each session or flow. The first uncompressed time stamp (TS0) of a session may be provided to the ANI_AD and the term_AD in an initialization header. The first header is provided to initialize the compressor (ANI_AD 112) and the decompressor (term_AD 136). The receiver timer is then incremented by 1 every T msecs. The ANI_AD 112 (compressor) uses the TS0 value to compress the time stamps of subsequent RTP packet headers. The term_AD 136 (decompressor) uses the TS0 value to decompress the compressed time stamp value (e.g., to regenerate the time stamps in subsequently received RTP headers).

current_timer—the value of the timer at the RTP receiver (e.g., terminal 130) when the current header is received last_timer—the value at the time at the receiver when the last header was received. (The current_timer is stored as the last_timer for the next header calculation of the time stamp).

m_last—the value of m for the last received header; m indicates the number of voice frames that have elapsed since the initialization header.

To compress the time stamp of the current packet, the ANI_AD 112 calculates the current value of m as: m_current=(TS_current−TS0)/TS_stride. Therefore, the ANI_AD subtracts the initial value of the time stamp (at the beginning of the session) from the current time stamp. This difference is divided by the time stamp stride (TS_stride). However, in some embodiments, it may be unnecessary to actually perform a division operation. Other techniques can be used to appropriately generate m_current without performing a division operation, which may require high processor overhead.

The k least significant bits of m_current are then provided as the compressed time stamp 414. The RTP packet including the compressed time stamp 414 is then transmitted over RF link 140 to the RTP destination or receiver (e.g., terminal 130).

At the RTP receiver (e.g., terminal 130), the terminal adapter (Term_AD) 136 decompresses the compressed time stamp 414. The current_timer value of the previous header is first stored as last_timer. Then, when the current header arrives, the term_AD 136 reads the value of the receiver timer 134 and stores this in memory as current_timer. Next, timer_diff is calculated as: timer_diff=current_timer−last_timer. The ANI_AD calculates the exact value of m_current by finding integer d, where:

$(-L/2 < d < L/2,$ where $L=2^k)$ such that: (Eqn. 1)

k least significant bits of $(d+m\_last+timer\_diff)$=compressed time stamp 414(for the current header). (Eqn. 2)

As noted, the compressed time stamp received is also k bits. Once d has been calculated using Eqns. 1 and 2, TS_current can then be calculated as:

$TS\_current=TS0+(d+m\_last+timer\_diff)*TS\_stride.$ (Eqn. 3).

In equation 3, the actual or correct value of m_current is shown in parentheses as (d+m_last+timer_diff). m_last+timer is the approximation of m_current, while d is the difference between approximation of m_current and the correct value of m_current. Also, TS0+(m_last+timer_diff)*TS_stride is an approximation of the current time stamp value, and d*TS_stride is the difference between the approximated current time stamp and the actual (or correct) value of the current time stamp.

Therefore, it can be seen that the RTP receiver first calculates an approximation (or estimate) of the current time stamp based on the elapsed time between receipt of the current header and the previous header (that was correctly decompressed), as: approximated current time stamp=TS0+(m_last+timer_diff)*TS_stride. The approximated current time stamp is then adjusted or corrected by the amount d*TS_stride to calculate the correct current time stamp value (TS_current).

Afer TS_current is calculated, the current RTP packet (including its regenerated or decompressed time stamp, TS_current) is provided up to the RTP endpoint 132. This compression and decompression process is transparent to the RTP endpoints.

Figure 5:
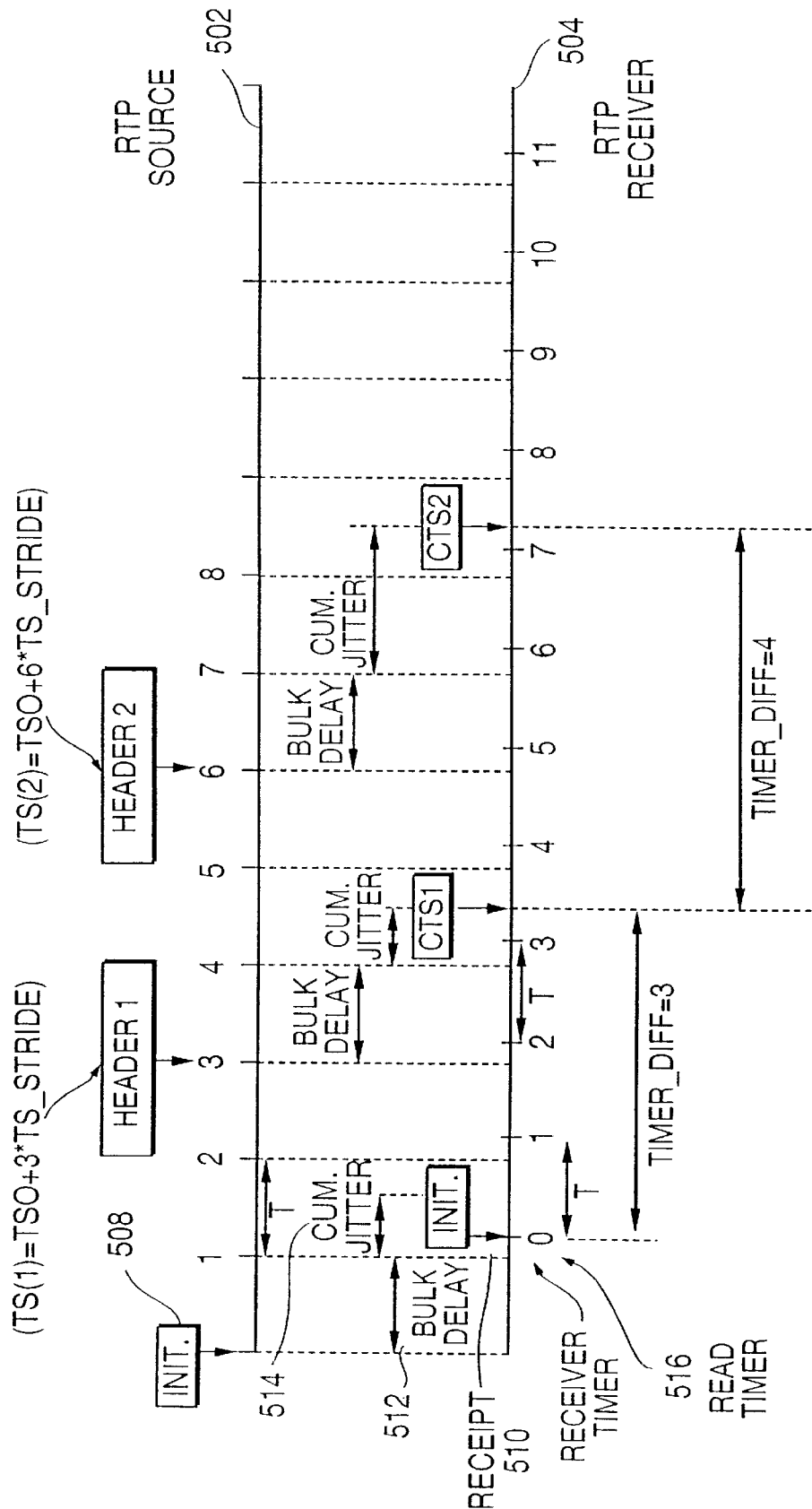
FIG. 5 is a diagram illustrating an example operation of header compression and decompression according to an embodiment of the invention.

FIG. 5 is a diagram illustrating an example operation of header compression and decompression according to an embodiment of the invention. This example applies some of the specific formulas described above to illustrate some features of the present invention. In this example embodiment, it is assumed that the timers at the RTP source 502 and at the RTP receiver 504 have the same frequency but are not typically synchronized. The timer at the RTP source (e.g., incrementing by 1 every T msecs) is used for generating the time stamp, while the timer (e.g., timer 134) at the RTP receiver is used to regenerate or decompress the RTP time stamp.

Referring to FIG. 5, at the beginning of a session, an initialization header 508 is generated at the RTP source, including an initial time stamp value (TS0). The initialization header 508 is transmitted to the ANI and then forwarded to the RTP receiver 504 (e.g., terminal 130). The time stamp in the initialization header is not compressed. Upon receipt of the initialization header, the initial time stamp value (TS0) is stored in memory at the ANI_AD, along with the TS_stride. According to one embodiment, two initialization headers may be transmitted to ANI_AD. ANI_AD can then calculate TS_stride as the second time stamp—first time stamp. Term_AD can similarly calculate TS_stride or receive the value in a packet.

Similarly, when the initialization header 508 is received at the RTP receiver (terminal 130), the initial time stamp (TS0) is stored in memory along with the TS_stride. Also, upon receipt 510 of the initialization header 508 (FIG. 5), m_current is cleared or reset to zero (0), and the receiver timer is then read and stored as initial_receiver_timer, 516. Instead of reading the timer at the beginning of the session, the receiver timer can be reset or cleared. In this example, the value read of the receiver timer at the beginning of the session just happens to be zero (0) for simplicity. Thus, the example shown in FIG. 5 applies to both embodiments (just reading the receiver timer, or resetting it to zero) because the free running timer is read as zero at the beginning of the session. Likewise, it is not necessary to clear m_current, but could instead record a value for m_current. The receiver timer is thereafter incremented (egg., by 1) every T msecs. (which is the same frequency as the timer at RTP source 502 used for generating time stamps). The initialization header 508 arrives at the RTP receiver 502 after a fixed delay (bulk delay 512) and a variable delay (cumulative jitter 514).

Next, the RTP source 502 generates the next RTP packet (the first RTP packet of the session after the initialization header). This RTP packet is generated at 3*T msecs after the initialization header was generated, and thus would typically include three (3) voice samples, for example. Other numbers are possible. Therefore, the time stamp for header of this packet is: TS(1)=TS0+3*TS_stride, as shown in FIG. 5. TS(1) refers to the time stamp generated after 3T msecs. after initialization. In this example, it shall be assumed that TS_stride is 100, for example. TS0 is assumed to be 0, for example. Thus, TS(1)=300.

The time stamp value for this packet, TS(1), is received at the ANI_AD and is compressed based upon TS(1) (the time stamp value), TS0 (the initial time stamp value) and TS_stride (the amount the time stamp increments every T msec.). According to an example embodiment, the compressed time stamp can be calculated as the k least significant bits of m_current. The ANI_AD 112 calculates the current value of m as: m_current=(TS_current−TS0)/TS_stride. In this example, it shall be assumed that TS_stride is 100, for example. In this example, m_current is calculated as: m_current=(300−0)/100=3. k in this example will be two (2). Thus, the two least significant bits of m_current (11 in binary) are provided as the compressed time stamp 414 for this packet (CTS1), FIG. 5.

The compressed time stamp (CTS1) arrives at the RTP receiver 502 and the term_AD 136 at the RTP receiver regenerates or decompresses the time stamp, TS(1), for the current packet. The value of current_timer (zero) is stored as last_timer and m_current is stored as m_last. m_current was previously set to zero at the beginning of the session (i.e., upon receipt of the synchronization header). The receiver timer value (3 in this case) is read and stored as current_timer. Timer_diff is then calculated as current_timer−last_timer, which is 3−0=3. Timer_diff+m_last is an approximation of m_current.

Next term_AD 136 calculates the exact or corrected value for m_current using equations (1) and (2). Using equation (2), the two least significant bits of (d+m_last+timer_diff)=CTS1 (the compressed timer stamp for current header). In this case, m_last is zero (0), timer_diff is three (3) and CTS1 is three (3). Thus, the two least significant bits of (d+0+3)=3. Thus, d is equal to zero.

Using equation (3), the decompressed time stamp for this packet is then calculated as TS(1)=TS0+(d+m_last+timer_diff)*TS_stride. Thus, as a result, TS(1)=0+(0+0+3)*100= 300. The decompressed time stamp for this packet, TS(1)= 300, is then provided to the RTP endpoint 132 at the RTP source, along with the RTP data and other decompressed header fields. The correct or actual value for m_current is (d+m_last+timer_diff). Therefore, for this packet, it can be seen that the approximation of m_current is the same as the correct value of m_current (but this is not true in the general case). m_current is then updated to be 3.

The next packet and time stamp is generated at the RTP source, including a time stamp TS(2)=0+6*100=600. At ANI_AD, the TS(2)=600 is compressed into a compressed time stamp as the 2 least significant bits of (600−0)/100=6. In this case, 6 in binary is 110. Thus, the two least significant bits of 110 is 10. Thus, CTS2=10 in binary.

The compressed time stamp for this packet (CTS2) is then received at the term_AD 136 after the receiver timer reaches the value of 7, due to the bulk delay and cumulative jitter. The value of current_timer (3) is stored as last_timer and m_current (3) is stored as m_last. The current receiver timer value (7 in this case) is read and stored as current_timer. Timer_diff is then calculated as current_timer−last_timer, which is 7−3=4. Timer_diff+m_last is an approximation of m_current, which is 7.

Next, term_AD 136 calculates the exact or corrected value for m_current using equations (1) and (2). Using equation (2), the two least significant bits of (d+m_last+timer_diff)=CTS2 (the compressed timer stamp for current header). In this case, m_last is 3, timer_diff is 4 and CTS2 is 10 (in binary, which is 3 in decimal). Equation 2 is solved for d as follows:2 lsbs (d+3+4)=2. Seven in binary is 111. Thus, d=−1. d is the difference between the approximation of m current and actual value of m_current. Plugging in d into equation (3), the time stamp for this packet is calculated as TS(2)=0+(−1+3+4)*100=600. Thus, term AD_136 of RTP receiver has correctly regenerated (e.g., decompressed) the RTP time stamp based on a local timer and a compressed time stamp.

It should be noted that, unlike previous techniques, it is unnecessary to resend an initialization header in the event that one or more packets do not arrive at the RTP receiver. In other words, synchronization between RTP source and receiver is necessary only once at the beginning of a session or connection. This is because, the current time stamp is calculated at the RTP receiver based on both m_last and timer_diff. Timer_diff is calculated as current_timer−last_timer. Therefore, the values of m_last and last_timer correspond to the last packet, regardless of which packet was last received (e.g., regardless whether packets sent after the "last" packet were erroneously dropped or lost). As a result, the timer-based compression scheme according to an embodiment of the invention is robust to errors and decreases bandwidth requirements because it is unnecessary to send a new synchronization packet (e.g., including complete uncompressed values for all headers) in the event that an error is detected (e.g., one or more packets dropped or lost).

In normal operation, the discrepancy between the approximation and the exact value of m_current is caused by:

a) Cumulative jitter between the very source of RTP time stamps and the receiver; actual delay=bulk delay+ cumulative jitter, where bulk delay is constant and cumulative jitter varies from one header to the next, and 0≦cumulative jitter≦maximum cumulative jitter; and b) Possible asynchronicity between the timer process and the decompressor process, depending on the timer implementation. Due to the asynchronicity, there can be an error of plus or minus or one (+ or −1) in the timer value (current_timer).

Figure 6:
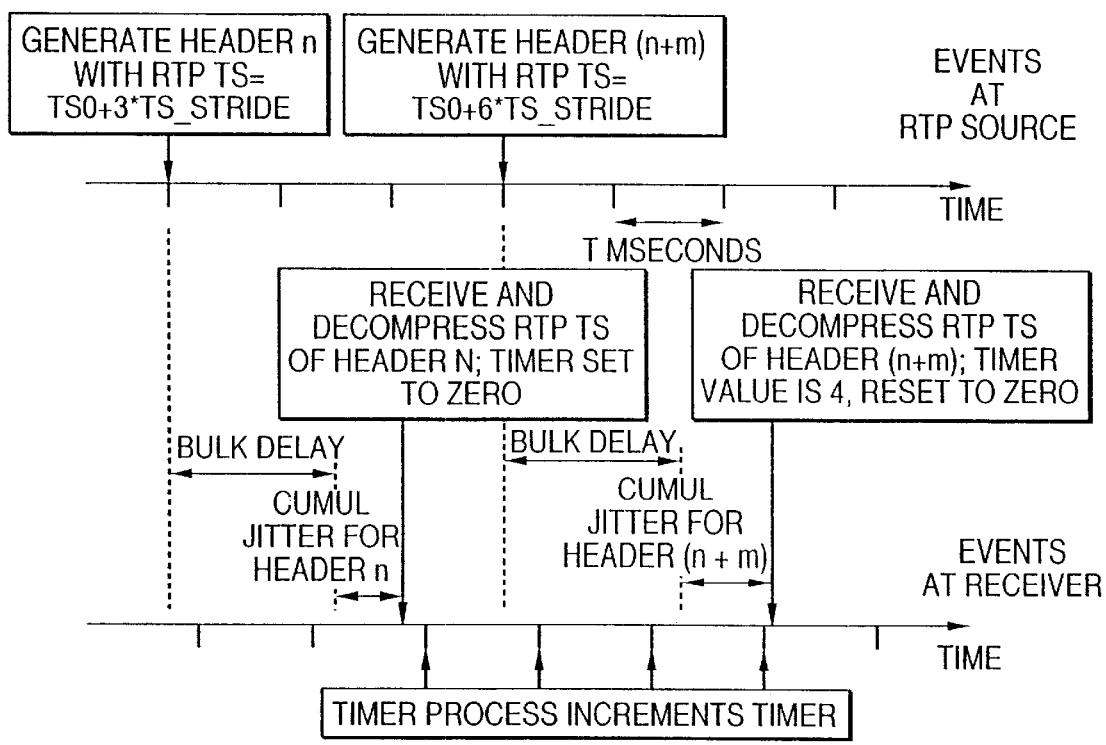
FIG. 6 is a diagram illustrating an example operation of header compression and decompression according to another embodiment of the invention.

FIG. 6 is a diagram illustrating an example operation of header compression and decompression according to another embodiment of the invention. Like FIG. 5, FIG. 6 is a diagram illustrating the effect of jitter and timer asynchronicity. In FIG. 5, the receiver timer is reset or cleared only at the beginning of the session. (This is not necessary as the receiver timer can be allowed just to continue to run.) However, in the example embodiment illustrated in FIG. 6, the receiver timer is reset or cleared to zero (0) for each packet. Thus, when a compressed packet header is received, the timer value is read, which indicates the timer_diff value described above (since the timer indicates the elapsed time since the last packet header). There may be many different ways to implement the invention. What is important is that a timer difference should be measured indicating the elapsed time (as measured by the local receiver timer) between the last successfully decompressed time stamp and the current time stamp (timer diff as described in FIG. 5).

Referring to FIG. 6, header n is generated with time stamp=TS0+3*TS_stride. This time stamp of header n is compressed and transmitted to the RTP receiver, and decompressed. The timer is then reset at the receiver. The next headers, (n+1), (n+2) and (n+3) are generated and sent, but only header (n+3) is received (i.e., header n+1 and n+2 are lost). For simplicity header (n+2) and (n+3) are not shown in FIG. 6. Header (n+1) is shown in FIG. 6 as header m+n. Header (m+n) is generated and sent, with time stamp TS=TS0+6*TS_stride. This time stamp of header (m+n) is compressed and then sent to the RTP receiver. The timer value is 4 (indicating timer_diff). This value is used to decompress the time stamp for header (m+n). Therefore, the example of FIG. 6 is very similar to the example shown in FIG. 5, except the timer is reset after receiving each header in FIG. 6.

Regardless which technique is used (either FIG. 5 or FIG. 6), an effective timer-based compression scheme can be used. However, if the cumulative jitter is excessive, it may not be possible to regenerate a correct time stamp based on the compressed time stamp. In many instances, the following condition should be satisfied by k to allow the timer based compression scheme illustrated in FIGS. 5 and/or 6 to work properly:

$$\text{(Maximum integral jitter+2)} < 2^k, \qquad \text{[Condition 1]}$$

where Maximum integral jitter (MIJ) is the maximum cumulative jitter, expressed in units of T msec, rounded to the next higher integer. For example, if T=20 msec, a maximum cumulative jitter of 15 msec will result in MIJ=1. 2 is added to the MIJ to account for the possible error caused by the timer asynchronicity.

Due to the conversational real-time requirements, the cumulative jitter in normal operation may be only a few times T msec. Therefore, in such a case, a value of k equal 4 is more than sufficient, as up to a 16 speech sample (i.e., 16*T msecs) discrepancy can be corrected at the RTP receiver. Abnormal or error situations may result in the jitter exceeding the normal values. A jitter reduction entity can be added upstream of the compressor to ensure that jitter, as seen by the compressor, remains within acceptable bounds.

The advantages of the time stamp compression scheme illustrated in FIGS. 5 and/or 6 include:

a) The size of the time stamp is constant and small. The compressed header typically consists of a message type, which indicates the type of message (k1 bits), a bit mask which indicates which field are changing, and a field that contains the k least significant bits of m_current (k bits). Assuming that the same 4-bit MSTI bit mask is used as in RFC2508, and k1 =4, the size of compressed header when only the RTP TS changes (this case is by far the most frequent) is 1.5 bytes. Furthermore, the size does not change as a function of the length of interval of silence.

b) As shown in, for example, in FIG. 6, the receiver timer operates at the same frequency as the RTP source timer (used to generate the original time stamp); Phase synchronization between the source timer and receiver timer is not required (because it is the time elapsed as measured the receiver timer is what is used to regenerate the time stamp).

c) At the receiver, no synchronization is required between the timer process and the decompressor process. For example the timer process may increment the timer by 1 every T msecs, while the decompressor process is woken to perform decompression when a new header is received. However, it is not required that the point at which the timer increments be aligned or synchronized with the point where the header is received (see FIG. 6).

d) Robustness to errors, as the partial RTP TS information in the compressed header is self contained and only needs to be combined with the receiver timer to yield the full RTP TS value. Loss or corruption of a header will not invalidate subsequent compressed headers e) No memory or values needs to be maintained or stored by the compressor for the purpose of RTP TS compression/decompression D. Handoff According to an embodiment, each ANI_AD is assigned to a specific area (e.g., interfaces terminals located in a specific area). Terminals (such as terminal 130) can move from one area to another. When a terminal moves from one area to another, the terminal must be handed off, or switched from one ANI_AD to another ANI_AD.

One case of handoff to consider is inter-ANI_AD handoff, where there may be a disruption caused by switching from the old ANI_AD to a new ANI_AD. The issue is how to maintain continuity of information through the handoff so that after handoff, the compression/decompression at term_AD 136 and the new ANI_AD continue without disruption.

1. Downlink

There is no discontinuity on the receiver side, which is the terminal (e.g., terminal 130, FIG. 1). The compressor's role is transferred from one ANI_AD to another. After handoff, the headers are routed on a new path going through the new ANI_AD instead of the old ANI_AD. In addition, depending on the design of the system, there may or may not be rerouting of in-transit packets during handoff. In-transit packets are those generated by the source but not yet arrived at the receiver by the time of handoff. Rerouting attempts to deliver the in-transit packets to the terminal.

To perform the handoff, the old ANI_AD must transfer the initial value of the time stamp for the session (TS0) and TS_stride to the new ANI_AD. These two values allow the new ANI_AD to continue to compress new time stamps (in new packet headers) received from the RTP source (e.g., terminal 102). Let Current_header be the very first header to be decompressed by the term_AD after handoff, and its TS_current its RTP time stamp. The term_AD can decompress TS_current as long as the following condition is met:

$$\text{(Downlink Transient integral jitter+2)} < 2^k, \qquad \text{[Condition 2]}$$

where Downlink Transient integral jitter (DTIJ) is the downlink transient jitter of Current_header, expressed in units of T msec, rounded to the next higher integer. Downlink transient jitter is defined as=total delay of Current_header−bulk delay on old path. If Current_header is not the header of a rerouted in-transit packet, total delay of Current_header is also bulk delay on the new path+cumulative jitter for Current_header on new path. Therefore, downlink transient jitter=bulk delay on the new path−bulk delay on the old path+cumulative jitter for Current_header.

If Current_header is the header of a rerouted in-transit packet, total delay of Current_header=total delay caused by routing and rerouting. In practice, systems should preferably be designed to keep downlink transient jitter in the same value range as the cumulative jitter in stable state (i.e. without handoff). Therefore, based on these assumptions (which may not always apply), no specific handoff-related problems for downlink are expected if condition 1 (noted above) is met.

2. Uplink

In this uplink description, the term_AD 136 of the terminal (e.g., terminal 130) compresses the time stamp and sends it over the RF link 140 to the local or corresponding ANI_AD. The RTP source in this case is the terminal 130. Even as the RTP source (the terminal 130) changes physical locations (requiring a handoff at ANI_AD), the receiver's (decompressors's) role is transferred from one ANI_AD to another. The RTP source stays anchored at the terminal (e.g., terminal 130, FIG. 1).

Figure 7:
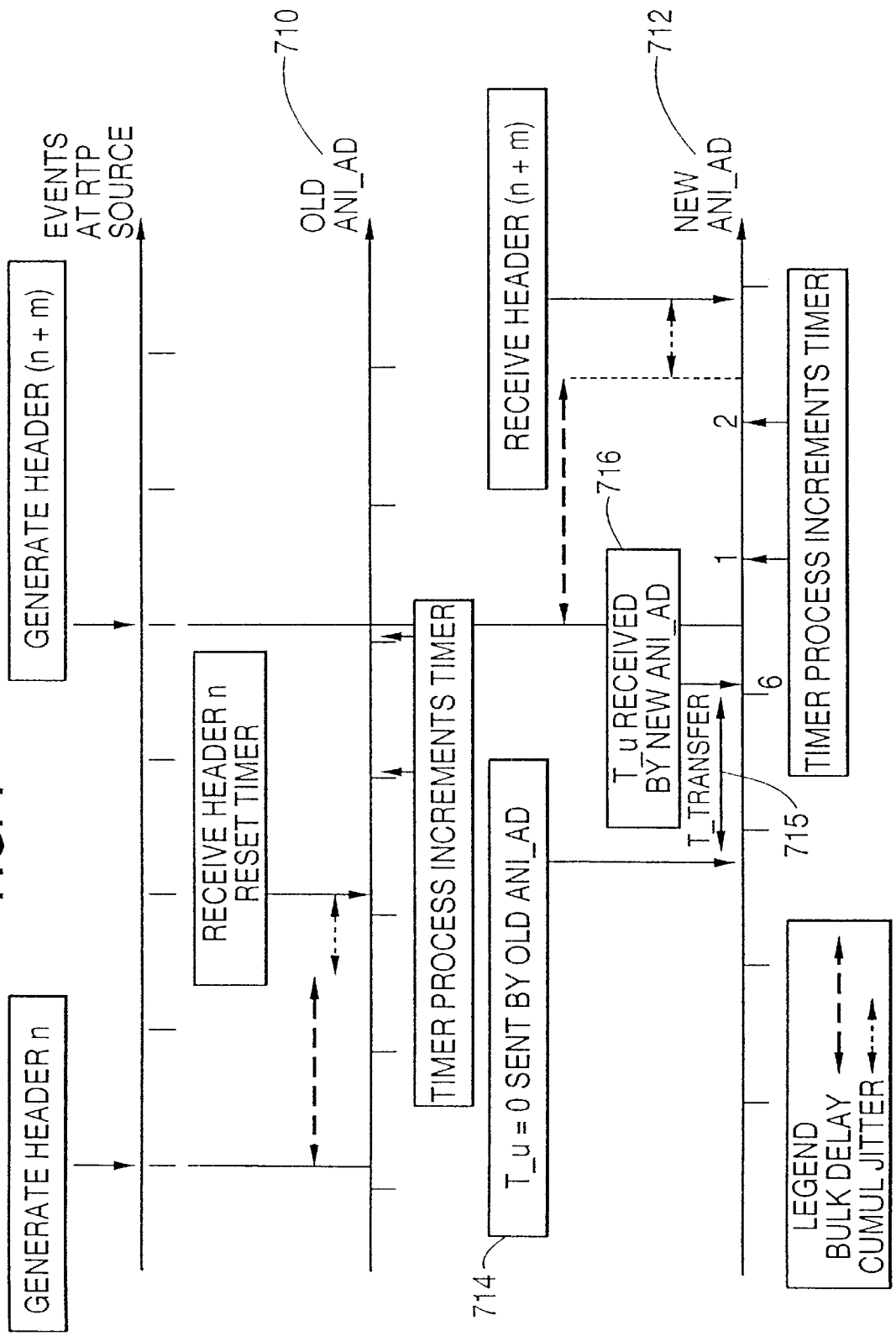
FIG. 7 is a diagram illustrating an example operation of handover according to an embodiment of the present invention.

FIG. 7 is a diagram illustrating an example operation of handoff according to an embodiment of the present invention. To minimize air interface overhead, some information needs to be transferred from an old ANI_AD 710 to a new ANI_AD 712 for handoff. That information is the timer value at the old ANI_AD. The old ANI_AD 710 reads (or takes a snapshot of) the current value of the Timer (T_u) at the old ANI_AD and sends it to the new ANI_AD, along with TS0, TS_stride and m_current, block 714 (FIG. 7). The new ANI_AD resumes incrementing its timer starting from (T_u). Let T_transfer 715 (FIG. 7) be the time to transfer the Timer. Also, the timer processes at the old and new ANI_AD may have a phase difference which is at most T msec. Let Current_header be the very first header to be decompressed by the new ANI_AD after handoff, and TS_current be its RTP time stamp. The new ANI_AD can decompress TS_current as long as the following condition is met:

(Uplink Transient integral jitter+2+1)<$2^k$, [Condition 3]

where Uplink Transient integral jitter (UTIJ) is the uplink transient jitter expressed in units of T msec, rounded to the next higher integer. Uplink transient jitter is defined as=total delay of Current_header−bulk delay on old path+T_transfer. Since Total delay of Current_header=bulk delay on new path+cumulative jitter for Current_header, uplink transient jitter=bulk delay on the new path−bulk delay on the old path+cumulative jitter for Current_header+T_transfer. Compared to the downlink case, 1 is added to account for the phase difference between the old ANI_AD timer and new ANI_AD timer.

Specifically, FIG. 7 also illustrates the uplink transient jitter, which includes the bulk delay difference and T_transfer. In this example, the old ANI_AD decides to prepare for the handoff before the timer increments the timer. Therefore it sends T_u=0 to the new ANI_AD 712. T_transfer is approximately T msec. At the new ANI_AD 712, due to the asynchronicity of the timer process, almost T msec elapse before timer gets incremented. There is also a cumulative jitter on the new path for header (n+m). As a result, the timer value read when header (n+m) is received is 2, while the real value should be 4. Thus, there is a skew of −2. As long as condition 3 is met, the skew can be eliminated and the RTP time stamp can be correctly decompressed.

According to an embodiment, T_u is transmitted on a high speed signaling network connecting the old and new ANI_AD. Consequently, the time T_transfer should be at most only a small few T msecs. However, the cases where the transfer of T_u is not successful, or not timely enough must be considered. In those cases, the new ANI_AD will notify the term_AD, which sends the full (uncompressed) RTP time stamp until an acknowledgment is received.

E. Jitter Reduction

According to an embodiment of the present invention, the timer-based compression scheme which uses a compressed time stamp and a local receiver timer may be predicated on the following conditions being met.

(Maximum integral jitter+2)<$2^k$, [Condition 1]

(Downlink Transient integral jitter+2)<$2^k$, [Condition 2]

(Uplink Transient integral jitter+2+1)<$2^k$, [Condition 3]

Due to the conversational real-time requirements, one can reasonably expect that the various jitters above are on the order of a few T msec in normal operation. Therefore, a small value of k, e.g. 4 is usually more than sufficient to allow any skew or error to be corrected. However, abnormal conditions on the path from the RTP source to the receiver (failures, etc.) or other situations may exists in which jitters become excessive (where the correct time stamp cannot be generated based on the compressed time stamp and local receiver timer). To deal with these cases, a jitter reduction function (JRF) 115 (FIG. 1) can be provided as a front end to the compressor, to filter out (or discard) packets having excessive jitter (e.g., where any of conditions 1, 2 or 3 above are not met).

To screen out or identify packets having excessive MIJ, the jitter reduction function (JRF) calculates the jitter of each packet received over network 108. If the measured packet jitter is greater than $2^k-2$, this is considered excessive jitter and the packet is discarded. Otherwise, the header (or header field) is compressed (as described above) and then transmitted to the receiver terminal (e.g., terminal 130).

The JRF calculates the jitter of the current packet as follows: jitter=absolute value of (TS2-TS1—JRF timer_diff), where TS2 is the time stamp of the current packet, TS1 is the time stamp of the previous packet, and JRF timer_diff is the difference in the JRF_timer between the current packet and the previous packet (elapsed time). This jitter value is compared to $2^k-2$. If the jitter is greater than $2^k-2$, the packet is discarded. Otherwise, the packet header is compressed at the ANI_AD and the packet with the compressed header is sent to the RTP receiver.

This jitter reduction function (JRF) 115 is an effective technique to limit the jitter on the packets received by the receiver terminal (because the jitter introduced over the RF link may be considered negligible). Moreover, the JRF operates to more efficiently use the available bandwidth over the RF link 140. In the absence of the JRF 115, one or more packets having a jitter greater than $2^k-2$ might be transmitted to the RTP receiver over link 140. However, at the receiver, if the jitter is excessive (i.e., condition 1 is not met), the correct time stamp value cannot be generated, causing the receiver to discard the packet. Thus, JRF merely operates to filter out those packets having excessive jitter that would be discarded at the receiver anyway (avoiding waste of valuable bandwidth over link 140).

II. Header-Stripping Scheme

A second embodiment of the present invention provides a timer-based header stripping scheme in which a header or one or more header fields (e.g., including the RTP time stamp) is stripped from the RTP packet prior to transmission across the low bandwidth link (e.g., across RF link 140, FIG. 1). In such a case, the time stamp is not explicitly provided in the RTP packet. Rather, timing information can be implicitly provided to the to a header regenerator for incrementing the local timer based upon an essentially constant bit rate channel or a circuit-like connection between the header stripper (e.g., which may exist at an ANI_AD) and the header regenerator (e.g., which may exist at terminal 130).

A. Header Stripping Overview

Header stripping is based on the idea that for some applications or services, it is not necessary to transport all of the information contained in the IP/UDP/RTP headers, either because they do not change, or because they are not essential to the application/service. Basic voice is a typical example. To provide a service equivalent to existing cellular voice service (e.g., over RF link 140, FIG. 1), the only variable header information that is essential is the RTP time stamp (TS). It is also desirable to maintain transparency for RTP sequence number (SN). Transparency here (for the SN) means that the SN after stripping/regeneration is equal to the original SN. Header stripping relies on the implicit timing information provided by a circuit-like connection or essentially constant bit rate channel (where no packet jitter is introduced) to allow the RTP time stamp to be regenerated based only on a local timer or counter. This eliminates the need to send the time stamp explicitly (or even send a compressed time stamp). To achieve transparency of SN, compressed SNs can be used in combination with the timing information from the circuit-like channel or connection. A circuit-like connection preferably provides a channel having an essentially constant bit rate. When there is no voice sample (e.g. silence interval), the channel may or may not be allocated to other traffic and/or users. Advantages of this header stripping scheme include:

a) Lowest header overhead, unmatched by any other scheme (even less than the compressed header technique described above in FIGS. 1–6).

b) Robustness to errors, since the timing information from circuit-like transmission or essentially constant bit rate channel is inherently unaffected by errors c) Possibility to switch during a call to header compression (e.g., technique of FIGS. 1–6), if so desired. This may be helpful if the call becomes multimedia, as a non-voice medium is added to voice. Furthermore, note that header stripping does not mandate or preclude statistical multiplexing, which if implemented, could occur at a lower layer.

Figure 8:
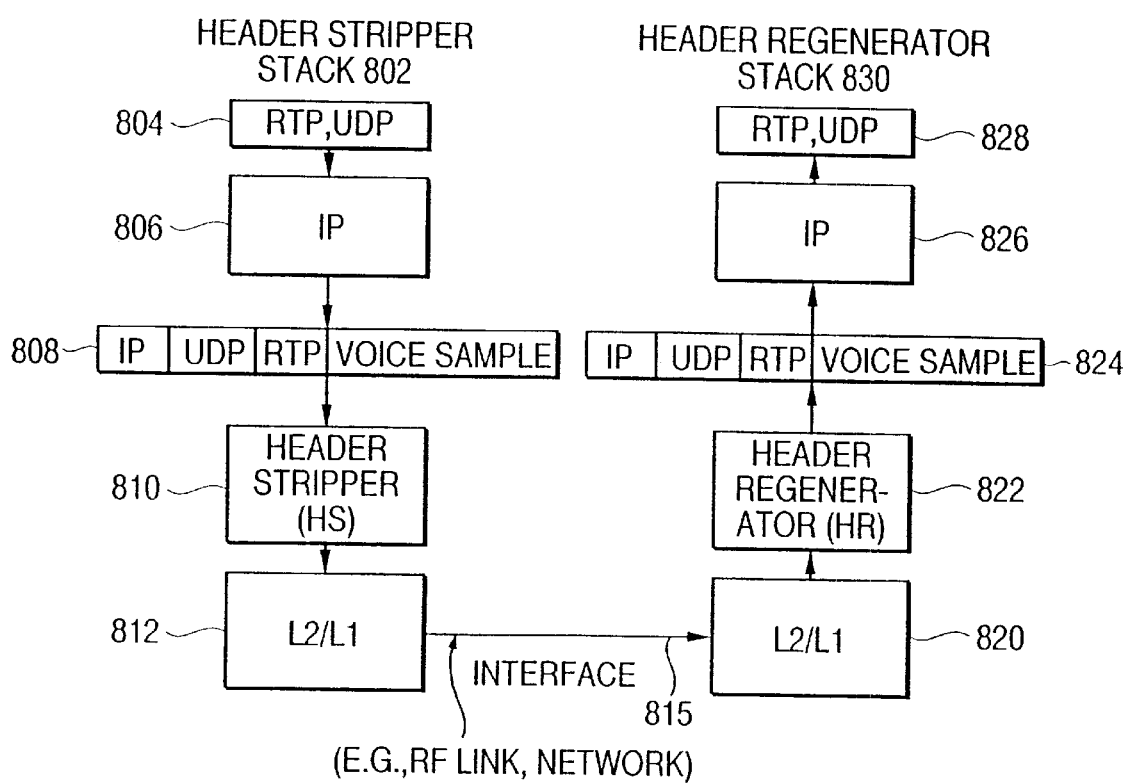
FIG. 8 is a block diagram illustrating an example stack according to an example embodiment of the present invention.

FIG. 8 is a block diagram illustrating an example stack according to an example embodiment of the present invention. A header stripper stack 802 and a header regenerator stack 830 are shown. As an example, the header stripper stack 802 illustrates some of the components that may be used to strip one or more header fields from the packet, while the header regenerator stack 830 illustrates some of the components that may be used to regenerate the packet header. The header stripper stack 802 could be provided, for example, within a type of ANI adapter (e.g., ANI_AD 112, FIG. 1), while the header regenerator stack 830 may reside, for example, at a type of terminal adapter (e.g., term_AD 136, FIG. 1).

Referring to FIG. 8, the header stripper stack 802 includes RTP and UDP layers 804, an IP layer 806. The RTP/UDP/IP layers generate an RTP packet 808 (which includes a time stamp in the RTP header). Next, at the header stripper stack 802, the RTP packet 808 is provided to a header stripper (HS) 810 for stripping or removing one or more headers or header fields. Layers L1 and L2 812 are provided, where L2 may be a data link layer and layer L1 may be a physical layer, for example. Other layers could be provided as necessary. Similarly, the header regenerator stack 830 includes corresponding layers L1 and L2 820, a header regenerator (HR) 822 which regenerates the header (including the RTP time stamp) to provide the complete RTP packet 824 (including RTP/UDP/IP headers). The packet 824 is provided to IP layer 826 and then to UDP and RTP layers 828. The layers L1 and L2 of the header stripper stack 802 and header regenerator stack 830 are in communication across a link 815 or air interface (such as an RF link 140) or across a network. For example, Voice over IP packets are passed through the header stripper 810 before transmission over the link 815 (e.g., wireless link or network). At the receiving end (at header regenerator stack 830), the header regenerator 822 regenerates the headers before delivery to the recipient. Layers L2/L1 may provide the circuit-like connection, i.e., providing an essentially constant bit rate channel between the header stripper 810 and header regenerator 822. In addition, for maximum efficiency, layer L1 may also perform voice payload optimization like uneven bit protection, in addition to optimized channel coding and interleaving. Note that the concept of header stripping is applicable regardless of whether payload optimization is done or not.

In operation, The header stripper (HS) 810 eliminates the jitter in the incoming RTP packets, and plays them back according to the RTP time stamp (TS) in the header. Here, eliminating jitter means scheduling the transmission of the voice sample on the circuit-like connection or essentially constant bit rate channel in accordance with the time stamp. In other words, the packets, after removal or stripping of the headers, are transmitted on the circuit-like channel or essentially constant bit rate channel at times based upon their time stamp in the packet. Packets with excessive jitter are discarded, using the jitter reduction function (JRF 115, FIG. 1), for example. The header regenerator (HR) 822 reconstructs the IP/UDP/RTP fields, which can be classified into the following categories:

a) Static: Value does not change for the duration of the session, e.g. IP addresses b) Non-static: Value could in principle change from one packet to the next, but in practice, for voice, the only non-static field that is essential to preserve through header stripping is the RTP time stamp (TS). RTP sequence number (SN) is also preserved. Static fields can be transferred once and for all as part of a full header in the initialization phase, at the start of the session. A reliable delivery mechanism can be used, (e.g. using Acknowledgments or Acks from the RTP receiver to acknowledge receipt of the initialization information). The time stamp and sequence number will be briefly discussed.

1. RTP Time Stamp (TS)

In the case of voice, RTP time stamp (TS) increases linearly as a function of the wall clock (i.e., source timer) at the RTP source. If the time interval between consecutive voice samples is T msec, then RTP time stamp of header n (generated at time n*T msec)=RTP time stamp of header 0 (generated at time 0)+TS_stride*n, where TS_stride and T are constants dependent on the voice codec. This is true if there is one packet per speech (voice) sample. More generally, RTP time stamp (TS) are of the form TS0+ m*TS_stride, where TS0 is <TS_stride and m is an integer. The same behavior is seen at the header stripper (HS) after jitter has been eliminated.

At the beginning of a session or connection, an initialization phase is performed to initialize the RTP receiver (i.e., initialize the header regenerator). In the initialization phase, the header stripper keeps sending initialization information (Init_info) until an Ack is received from the receiver. Init_info(n) consists essentially of the full IP/UDP/RTP header n (including an initial time stamp and sequence number). The RTP sequence number is used to identify this particular initialization header, since subsequent initialization headers will include larger sequence numbers (assuming the first initialization header is not acked).

At the header regenerator (HR) 822, when Init_info(n) is correctly received, the HR 822 sends an ack(n). Once the header regenerator (HR) 822 has acked a full header, the HS 810 stops sending full headers. The HR 822 also starts a local time stamp counter that is initialized to the RTP time stamp received in the Init_info(n). The TS counter is similar to the receiver timer in FIG. 1, but the TS counter is incremented by TS_stride every T msecs (rather than by 1, but it is the same principle as the receiver timer). For subsequent stripped speech frames (i.e., RTP packets where the headers have been stripped or removed), the RTP TS is regenerated from the time stamp (TS) counter. The receiver timer (TS timer) has the same frequency as the clock or timer used at the RTP source (i.e., source timer) to generate the time stamp. Moreover, the circuit like connection provides an essentially constant bit rate, and thus, the packet delays are not variable or do not change from packet to packet. As a result, there is no packet jitter due to the essentially constant bit rate channel. Therefore, after the RTP receiver receives the initialization information, including an initial time stamp value (TS0), the RTP receiver can regenerate a correct time stamp for each subsequent packet (after initialization) based only on the time stamp counter (or receiver timer).

The essentially constant bit rate channel provided between the header stripper 810 and header regenerator 822 need only provide a predetermined number of bits over a predetermined period of time between the header stripper 810 and the header regenerator 822, but this function can performed a variety of different ways. For example, the channel can be a constant bit rate channel that is dedicated to the stripper 810 and regenerator 822 or shared among several users. The channel can provide, for example one bit every millisecond, or provide 100 bits every 100 milliseconds but where the data rate may not be constant (i.e., may vary) within a 100 ms period. As an additional example, the channel may provide the predetermined number of bits through one or more data bursts between the header stripper and header regenerator. For example, the channel may provide a chunk or burst of 1000 bits every 10 milliseconds. Thus, the essentially constant bit rate channel need only provide a predetermined number of bits over a predetermined period of time, but can accomplish this using different techniques.

2. RTP Sequence Number (SN)

RTP SN (as seen by the HS 810) normally increases by 1 from one packet to the next. The only exceptions are when packets are lost or misordered. In the uplink, packet loss or misordering is not expected to happen, since the header stripper (HS) 810 and RTP source are very close to each other. Therefore, the following applies to the downlink. The HS 810 does limited buffering to attempt to reorder packets before stripping their headers. Packet with RTP SN n is considered lost if it is still not received by the time packet with RTP SN (n+1) has its header stripped. Packet with RTP SN m is misordered if, by the time it is received, packet with RTP SN k has had its header stripped, and k>m. The length of the reordering buffer is a design parameter. Too long a buffer will result in an excessively large delay, while too short a buffer will result in too many discarded packets. The parameter also depends on the quality provided by the IP network 108 upstream of the HS 810. The HR 822 maintains a SN counter which is its best estimate of SN. By observing the Init_info, the HR 822 can obtain the initial SN and the number of bits contained in a packet also known as packet size (p_size). The HR 822 initializes the SN counter with the SN in Init_info. The HR 822 then "counts" the speech bits received over the essentially constant bit rate channel and increments the SN counter 1 for every p_size bits of speech (it is not incremented when no packet is received, e.g. during a silence interval). According to an embodiment, the HR 822 does not actually count the received bits. Rather, the SN counter at the HR 822 is incremented by 1 every packet duration, where a packet duration is the time required to receive a packet of bits (p_bits). Thus, the packet duration will be a function of the packet size (p_size) and the bit rate(which is constant over the circuit like connection.

Thus, it can be seen that after initialization occurs (providing the initial SN and TS to the HR 822), the HR 822 can generate the time stamps for sequential packets by incrementing the TS counter by TS_stride every T msecs, and by incrementing the SN counter by 1 every packet duration. Therefore, after initialization, these fields can be regenerated at HR 822 with reference only to a local clock (assuming TS_stride and packet duration are known by HR 822). The incrementing of SN counter based on time (packet duration) rather than an actual counting of received bits is more robust to errors. In the event one or more bits are dropped before reaching the HR 822, the SN counter will reflect the true value and will not be affected by the lost bits.

B. Discontinuities and Strings

The above description indicates that TS and SN can be completely stripped by HS 810 prior to transmission across a link (e.g., RF link 140), and then regenerated by the HR 822 maintaining a local clock or timer (e.g., incrementing TS counter by TS_stride every T msecs and incrementing SN counter by 1 every packet duration). However, one or more basic discontinuity events may occur which, if not addressed, could likely invalidate the timer-based regeneration approach described above. Some of the discontinuity events may include:

a) Event "New spurt": Transient change in the TS difference between packet n and (n+1) (start of a new talk spurt); this may also be described as a non-linear change or a shift in the time stamp (TS).

b) Event "Size change": Change in RTP packet size (p_size), caused by a change in the number of speech frames packed in a packet and/or size of the speech frame c) Event "Stride change": Change in TS_stride (caused, e.g., by a change in-payload type PT).

We define a header string as a sequence of packet headers such that all the packets have the same size (p_size), sequence numbers are consecutive, i.e. n, (n+1), (n+2), etc., and the time stamps(TSs) of consecutive packets are spaced apart by the same increment TS stride. In other words, a header string may be considered to be a string of headers having some packet fields in common (e.g., packet size), and other fields which increase linearly across consecutive packets, such as SN and TS. A string is usually a talk spurt (e.g., a series of voice samples provided between intervals of silence).

The transition from one string to another can be caused by any of the discontinuity events, singly or even in combination. In this scheme, when a string begins (and the previous string has ended), the HS 810 determines which discontinuity event has occurred, and accordingly sends the needed string initialization (string_init) information to the HR 822.

FIG. 9 is a table illustrating information which may be provided in messages according to an example embodiment of the invention. Init_info typically includes a full header (including full SN and TS), and is sent from the HS 810 to HR 822 (to initialize HR 822) at the beginning of the session. HS 810 will continue to resend the init_info until receiving an ack from HR 822, before proceeding with sending of the headerless data packets. Thereafter, there may be one or more strings which can occur, which may require additional updates of fields or values which change from one string to another. These changed values are provided to the HR 822 using string_init.

String_init includes the p_size value (if it has changed from the previous string), and the TS_stride value (if it has changed from the previous string). If no non-linear shift occurs to the TS from one string to the next, the HR 822 can continue to regenerate the TS based on the TS counter used in the old string. However, if a non-linear shift in the time stamp (TS) occurs between strings (i.e., loss of timing), the updated time stamp must be explicitly sent in the string_init from the HS 810 to the HR 822. The updated TS can be sent as a compressed time stamp 414 (see FIG. 4) described above so long as condition 1 is met, as described above. Otherwise, if condition 1 is not met, the full updated time stamp must be transmitted to the HR 822.

In ack mode, after the HS 810 sends the string_init to the HR 822, the HS 810 may require the HR 822 to acknowledge (or ack) receipt of the updated string information (string_init) before the HS 810 can send the further data packets (headerless packets) to HR 822. In acknowledged or ack mode, the HS 810 repeatedly sends a string_init message to the HR 822 until the HS 810 receives an ack from HR 822 for a string_init message. After receiving an ack from the HR 822, the HS 810 will then send the remaining packets of the string as stripped-header packets (since the TS and SN for packets of the new string can now be regenerated using only a local clock or timer). The ack requirement (in acknowledged mode) for the string_init message prevents the HS 810 from sending a new string without notifying the HR 822. For example, if the HS 810 sends a new string_init message (e.g., providing updated fields or information related to a discontinuity event) while the link between the HS 810 and HR 822 is temporarily broken, the HS 810 cannot proceed to send header-stripped packets until first receiving the ack from the HR 822.

Once the HS 810 is confident that the HR 822 has received the string_init information, speech frames (e.g., data packets) are then sent without the header for the remainder of the string. For these headerless frames, TS and SN are regenerated by using a local clock at the HR 822.

The HS 810 can determine the events as follows:
a) Event "New spurt": TS difference between packet having SN=n and packet having SN=(n+1) is different from TS_stride. This means the beginning of a new string or talk spurt. In this case, to ensure SN synchronization, string_init consists of a SN or compressed SN (C_SN). If there were no SN information sent, the HR 822 cannot be sure that incrementing SN counter by 1 every packet duration will give an accurate SN. This is because there could have been a link disconnection, during which speech bits were lost between the HS 810 and HR.
b) Event "Size change": Size of RTP packet having SN=n is different from previously received packet; this will affect the value of packet duration (the rate at which SN counter is incremented). string_init includes new p_size value.
c) Event "Stride change": Determined from analyzing payload type (PT) field in RTP packet; string_init includes new TS_stride value.

These discontinuity events are provided only as examples. Other types of discontinuity events are possible.

Events can happen in combination (compound event). In that case, string_init includes all the information from the corresponding basic events. For example, if "New spurt" happens in combination with "Size change", string_init= {C_SN, new p_size value}

C. Procedure to Send Init_info, String_init

Init_info is normally sent in ack mode, whereby the HS 810 will send Init_info until acked by the HR 822. String_init can be sent in ack or unack mode. In ack mode, the HS 810 will send String_init at every packet until acked by the HR 822. Once an ack is received, the HS 810 sends only speech bits for the remainder of the string, without any header. In unack mode, the HS 810 will send String_init a certain (predetermined) number of times before sending speech bits only for the remainder of the string. Optionally, the string_init can be repeated at some interval during the string to ensure the HR 822 is synchronized (e.g., has the proper values).

A compound event which includes the "Size change" or "Stride change" basic event will typically require String_init to be sent in ack mode. In that case, string_init will carry a generation number. The generation number is a counter incremented whenever p_size or TS_stride changes. It is used in the case where p_size or TS_stride change in rapid succession, to keep track of which change has been acked by the HR 822. For example, if p_size changes from value p_size_0 to p_size_1, then again to value p_size_2, the HS 810 will send string_init containing p_size_1, with generation number say 3, then subsequently another string_init containing p_size_2, with generation number 4. The receipt of an ack subsequent to the second string_init will be ambiguous, if it didn't carry the generation number of the string_init being acked. If the compound event is only "New spurt", String_init (C_SN) can be sent in ack or unack mode. The unack mode is based on the idea that C_SN will be repeated at least at the start of every talk spurt. Therefore the probability that the HR 822 will never resynchronize its SN is asymptotically small. In addition, if the SN is desynchronized, it is only caused by packet loss between the HS 810 and HR 822. Therefore the effect of a SN desynchronization is that regenerated SN<correct SN. This is just a transient inconsistency that is corrected by having the SN increasing by the difference as soon as the next C_SN is received. A SN increase by more than 1 will be interpreted by the receiving RTP endpoint as packet loss(es), and normally should not affect the playback of the received packet itself. The unack mode also allows to dispense with a channel to carry acks in stable state, i.e. after call setup and between handovers.

D. Handover

When the header stripping/regeneration is applied to cellular systems or other systems where station terminals can move from one network adapter (ANI_AD) to another, handovers or handoffs should be considered.

The handover can be modeled as going through three phases: handover preparation, handover execution and handover completion. There is a function called handover (HO) manager (which may be provided in the ANI 110) that decides to start handover preparation. Traditionally, handover preparation consists of exchanging signaling messages with the target system to reserve resources in the target system and obtain necessary information on the target cell. Handover execution is initiated by the source HO manager sending a HO command to the receiver terminal (or mobile station), along with the information on the target cell. In response to HO command, the terminal (or mobile station) executes the handover. Handover completion involves exchange of signaling between the terminal or mobile station and the target system, notification to the source, and release of resources no longer needed (e.g. at the source).

1. Uplink

The ANI_AD acts as a HR 822 for the uplink data transmission (see uplink 142, FIG. 1). The target ANI_AD has to be provided with the necessary information to regenerate the full header. The main constraints include continuity of RTP TS and RTP SN through handover (HO).

FIG. 10 is a diagram illustrating a handover process according to an example embodiment of the present invention. The terminal 130 (or mobile station MS), as an example, may notify the source ANI_AD 112 that the packet size has changed using a string_init message, step 902. The source ANI_AD 112 acknowledges this update to the p_size, step 904. Subsequently, the terminal 130 moves to a new area covered by the target ANI_AD 114, and the HO manager 901 notifies the source ANI_AD of preparation for a handover (handoff), step 906. The source ANI_AD then sends a HO_initialization (HO_init_u) information to the target ANI_AD 114, step 908. HO_init_u is an estimated view of the full IP/UDP/RTP header. The estimated view consists of the last regenerated header, but with a RTP TS replaced by TS0_u, m_last_u, TS_stride_u, and value of TS Timer_u. These values are related to TS_last, the RTP TS of the last regenerated header as follows: TS_last=TS0_u+m_last_u*TS_stride_u. TS Timer_u is a counter at the source ANI_AD that was incremented by 1 every T msec. In addition, HO_init_u includes p_size_u (current size of packet in the uplink direction). From HO_init_u, the target ANI_AD derives the static fields, as well as approximate initial values for changing fields (RTP TS and RTP SN). A handover command is sent from the HO manager 901 to the terminal 130 (mobile station), step 910, causing the terminal 130 to switch and now use the target ANI_AD for communication. However, a HO manager may not be necessary as other techniques can be used to initiate a handover.

A handover is considered as breaking any ongoing string. Therefore, after handover completion, the very first speech sample to be sent is always handled like a new string, which requires sending initialization information (HO_sync_u), step 912. There are three significant points in time: ST1, which is the start of HO preparation, ST2, which is the receipt by MS of HO command, and ST3, which is the time the source ANI_AD took the snapshot of its internal information to be sent in HO_init_u. Let HOT be the time elapsed from ST1 to ST2. From the system design, there is an upper bound on HOT: HOT<HOT_max. A fourth significant point in time is ST4: the first time when the terminal 130 wants to resume sending speech in the target system after HO. At ST4, the terminal 130 (MS) determines if the most recent change in p_size_u has been acknowledged by time ST2−HOT_max. If so, the terminal 130 is certain that HO_init_u contained the up-to-date value of p_size_u. Therefore, there is no need to include it in HO_sync_u. This is because the points in time are ordered as ST1<ST3<ST2. Otherwise, the terminal 130 (MS) will include the new value of p_size_u in HO_sync_u. The same algorithm applies to TS_stride_u.

In all cases, HO_sync_u includes C_SN. C_SN is needed because there was a break caused by HO. C_TS is needed if the bit rates, packet durations, etc. in the source and target systems are not synchronized. This is likely to be the case. HO_sync_u is preferably sent in ack mode.

HO_init_u and HO_sync_u are used by the target ANI_AD 114 to regenerate the full header as follows. All fields except TS and SN are copied from HO_init_u. SN is obtained by decompressing C_SN in HO_sync_u. TS is determined by decompressing C_TS in HO_sync_u.

2. Downlink

The HS role is transferred from one ANI_AD to another. After handoff, the headers are routed on a new path going through the new ANI_AD instead of the old ANI_AD. As a result, there could be a discontinuity in the timing for the RTP TS regeneration at the terminal 130 (MS).

To handle handover for the uplink, when the HO manager decides,to start handover preparation, it will notify the source ANI_AD. The source ANI_AD then sends a HO_initialization (HO_init_d) information to the target ANI_AD. HO_init_d consists of p_size_d and TS_stride_d, which are the values last acknowledged by the MS, along with their generation number. The first time when the target ANI_AD wants to send speech after HO, the target ANI_AD has to send HO_sync_d. HO_sync_d consists of C_TS and C_SN. If the new p_size differs from p_size_d, HO_sync_d also contains the new value of p_size. If not, HO_sync_d just contains the generation number n of p size_d. The MS uses the generation number to retrieve the correct p_size. This assumes the MS kept in memory the last few values of p_size, along with their generation number. The same algorithm applies to TS_stride. HO_init_d is sent until acked by the MS_AD. HO_sync_d is sent in ack mode. Handover process is depicted in FIG. 2. The case shown is: the most recent change in p_size_u has been acknowledged by time ST2−HOT_max.

E. Sending Messages

Each of the above information can be sent in-band or out-of-band. In the in-band approach, the information is sent on the speech channel by stealing the least significant voice bits. In the out-of-band approach, a dedicated transient channel is set up and torn down when an ack is received. A combination of in-band and out-of-band is possible, whereby the out-of-band approach is attempted, but the in-band approach is a fall back solution if there is no resource for a transient channel. Acknowledgments can be sent in-band, or out-of-band on their own dedicated ack channel, or out-of-band piggybacked on the other dedicated transient channels (TIC, etc.)

1. In-band

Regardless of how the circuit-like speech channel is realized, it can be modeled as a channel that can transmit B bits every T milliseconds. If S is the size of a speech frame in bits, $S \leq B$. With the envisioned voice codecs, Init_info is expected to be larger than S. Therefore an Init_info cannot be sent in the space of a single speech frame. However, there is a factor $R>=1$ such as $(R-1)*S<H \leq R*S$. The Init_info(n) can be carried on the circuit-like channel by splitting them in chunks of B bits and sending one chunk every T mseconds. A full header will consume the space of R consecutive speech samples. FIG. 11 is a diagram illustrating an initialization for in-band according to an example embodiment of the invention. If there is continuous voice activity, Init_info sent are Init_info(0), Init_info(R), Init_info (2R), etc. until an ack(n) is received. In FIG. 11, these init_info messages are shown as init_info 500 and init_info 502. The header stripper acks init_info 500, but not before the HS 810 sends a second init_info packet 502. The next packet 504 is sent from HS 810 to HR 822 as packet payload 504 (without header). The HR 822 then regenerates the SN and TS and other header fields.

Init_info (0) takes the place of speech samples 0, 1, . . . , (R−1), Init_info(R) takes the place of speech samples R, (R+1), . . . , (2R−1), and so on. If there is discontinuous voice activity, say header 0 is followed by a L*T msec silence interval, then Init_info(0) is repeated. The other information (string_init, HO_sync_d, HO_sync_u, Ack), all have a size well below S, so they fit into the space of a speech frame. They steal the least significant voice bits. For simplicity, the analysis does not take into account the expansion caused by channel coding, but the concept is valid with or without channel coding. Initialization process for in-band case is shown in FIG. 3.

2. Out-of-band

FIG. 12 is a diagram illustrating an initialization for out-of-band according to an example embodiment of the invention. In the out-of-band approach, a separate channel is set up with the appropriate bandwidth to carry just the Init_info concurrently with speech, which is carried on a speech channel. The separate channel is called the transient initialization channel (TIC). The system can attempt to allocate enough bandwidth for the TIC to permit sending a full header once every T msec. The TIC is designed to have a fixed timing relationship with the speech channel. Acknowledgments can be sent out-of-band by allocating a transient acknowledgment channel (TAC), or sent out-of-band, but piggybacked on a forward transient channel. HO_sync_u can be sent out-of-band over a transient uplink handover synchronization channel (TUHOSC). TUHOSC is torn down when HO_sync_u is acked. The same applies to HO_sync_d, which uses a transient downlink handover synchronization channel (TDHOSC).

3. Failure Cases

There can be cases where the target ANI_AD will not have HO_init by the time the handover execution is finished. Reasons include excessive delay on the signaling network between the two ANI_ADs, need to execute handover quickly, etc. In those cases, the network will send a notification to the MS, which then restarts the initialization process, like at the beginning of the call.

4. Common Case Where P-Size and TS_stride are Constant

The case where p_size and TS_stride are constant is by far the most common for voice. In this case, none of the considerations caused by possible change of p_size and TS_stride apply. The generic scheme is simplified. HO_init_d is not needed. HO_sync_d and HO_sync_u only carry C_SN and C_TS. String_init carries C_SN. It carries C_TS only if there is a timing change from one string to the next. The terminal (MS) does not have to keep in memory the last few values of p_size and TS_stride. In case of HO, the terminal (MS) does not have to determine whether to include p_size_u in HO_sync_u.

As described above, the only information in the IP/UDP/RTP headers that is essential for basic voice are the static fields and RTP time stamp (TS) and the. RTP sequence number (SN) is also very desirable. The scheme described herein achieves transparency for these information fields, and provides an advantageous header overhead compression efficiency. Continuity of all static and non-static fields is maintained through handover. Bandwidth management is also made easier, because in-band as well as out-of-band approaches are possible. Since transparency is maintained for RTP TS and RTP SN, it is even possible to switch back and forth between the header stripping scheme and the header compression scheme described herein that maintains transparency for all the fields. Switching to header compression may be needed when for example, another medium is added to voice.

III. Timer and Reference Based Scheme

A. Timer and Reference Based Scheme Overview

The timer and reference based scheme is based on the observations that (1) RTP time stamps when generated at the RTP source are correlated with a linear function of elapsed time between packets, and (2) RTP TS are of the form TS0+index*TS_stride, where TS0 and TS_stride are constant, and index is an integer (hereinafter index will be referred to as the packed RTP TS). Therefore, in normal operation, the RTP time stamps received at the decompressor are also correlated with continually incrementing timer, with a distortion created only by the cumulative jitter between the source and the decompressor. Since the cumulative jitter includes "network" jitter (jitter between the source and the compressor) and "radio" jitter (jitter between the compressor and decompressor), the compressor can calculate an upper bound of the cumulative jitter by adding to the observed network jitter an upper bound of the radio jitter. The compressor then just sends as compressed RTP TS the "k" least significant bits of the packed RTP TS. The decompressor decompresses RTP TS by first calculating an approximation, and then refining the approximation with the information in the compressed RTP TS to determine the exact value. The approximation is obtained by adding to the RTP TS of the previously decompressed header a value proportional to the time elapsed since the previously decompressed header was received. The exact value of RTP TS is determined as the one closest to the approximation, whose k least significant bits of the corresponding packed RTP TS match the compressed RTP TS. The compressor chooses a value k as the smallest value permitted that would allow the decompressor to decompress correctly, based on the upper bound of the cumulative jitter.

B. Case of Voice

First, the timer and reference based scheme will be described with respect to voice. As an example, if the time interval between consecutive speech samples is 20 msec, then RTP time stamp of header n (generated at time n*20 msec)=RTP time stamp of header 0 (generated at time 0)+TS_stride*n, where TS_stride is a constant dependent on the voice codec. Consequently, the RTP TS in headers coming into the decompressor also follow a linear pattern as a function of time, but less closely, due to delay jitter between the source and the decompressor. In normal operation (absence of crashes or failures), the delay jitter is bounded, to meet the requirements of conversational real-time traffic.

In this scheme, the receiver uses a timer to obtain an approximation of the RTP TS of the current header (the one to be decompressed), then refines the approximation with the additional information received in the compressed header.

For example, assume the following:

Last_header is the last successfully decompressed header, where TS_last is the last RTP TS, and p_TS_last is the last packed RTP TS (at the receiver);

T is the normal time spacing between two consecutive speech samples;

TS_stride is the RTP TS increment every T msec;

Current_header is the header of a current packet to be decompressed, where TS_current is the current RTP TS, and p_TS_current is the current packed RTP TS;

RFH is the sequence number of a header whose ack was received by the compressor, where TS_RFH is the RTP TS, and p_TS_RFH is the packed RTP TS;

Timer is a timer incremented every T msec, where both the compressor and decompressor each maintain their a Timer, denoted S_timer and R_timer respectively;

T_RFH is the value of the Timer when RFH has been received, and T_current is the value of the same Timer when the Current_header has been received;

N_jitter(n, m) is the observed network jitter of header n relative to header m (header n is received subsequently to header m), where N_jitter (n,m) is calculated by the compressor as follows:

N_Jitter(n,m)=Timer(n,m)−(packed RTP TS of header n−packed RTP TS of header m), where Timer(n,m) is the time elapsed from header m to header n, expressed in units of T msec. N_Jitter(n,m) can be positive or negative. N_Jitter at the compressor is the network jitter, quantized in units of T msec.

R_Jitter(n,m) is the radio jitter of header n relative to header m, predicted by the compressor. R_Jitter depends only on the characteristics of the compressor-decompressor channel (CD-CC). R_Jitter does not have to be calculated precisely, a good upper bound for R_jitter is sufficient. For example, an upper bound can be Max-radio_jitter, the maximum jitter on the CD-CC, if it is known.

Thus, according to the above, cumulative jitter for a packet is calculated as the sum of network jitter and radio: Further, RTP TS is calculated as follows:

$$RTP\ TS = TS0 + index * TS\_stride,$$

where TS0<TS_stride and index is an integer.
Thus TS_last=TS0+index_last*TS_stride, and $$TS\_current = TS0 + index\_current * TS\_stride.$$

1. Compressor

The compressor sends in the compressed header, k least significant bits of p_TS_current.

The compressor runs the following algorithm to determine k:

Calculate Max_network_jitter;

$$Calculate\ J1 = Max\_network\_jitter + Max\_radio\_jitter + J,$$

where J=2 is a factor to account for the quantization error caused by the Timers at the compressor and decompressor, which can be +1 or −1; and Find the smallest integer k that satisfies a condition of:

$$(2*J1+1) < 2^k.$$

Figure 15:
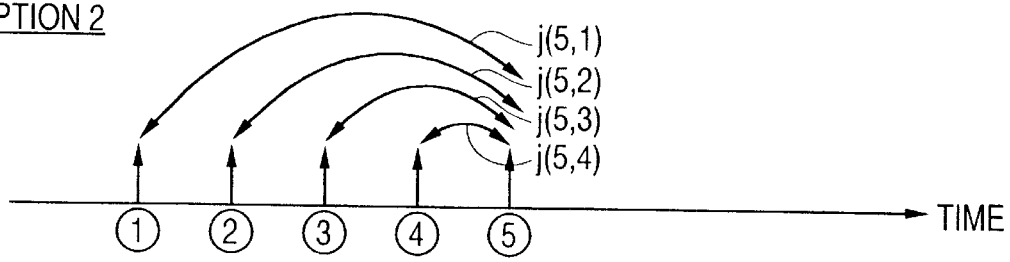
FIG. 15 is a diagram illustrating the steps of calculating network jitter according to a third method set forth as Option 2 of the present invention.

Network jitter at the compressor can be calculated according three different methods, namely a first method illustrated in FIG. 13 a second method illustrated in FIG. 14 and a third method illustrated in FIG. 15. The second and third methods are described below as Option 1 and Option 2 respectively. The first method is adequate for calculating network jitter. However, the preferred methods for calculating network jitter at the compressor are the second and third methods described as Option 1 and Option 2 respectively below.

As illustrated in FIG. 13, according to the first method network jitter for a particular packet at the compressor is calculated using information with respect to the immediately preceding packet. Thus, for example, network jitter for packet 2 (j2) is calculated using information with respect to packet 1, network jitter for packet 3 (j3) is calculated using information with respect to packet 2, network jitter for packet 4 (j4) is calculated using information with respect to packet 3, and network jitter for packet 5 (j5) is calculated using information with respect to packet 4.

Thus, according to FIG. 13, network jitter for packet 2 equals the calculated jitter j2, network jitter for packet 3 equal the calculated jitter j3, network jitter for packet 4 equals the calculated jitter j4, and network jitter for packet 5 equals the calculated jitter j5.

Option 1:

The steps used to calculate network jitter for the second method of Option 1 are illustrated in FIG. 14. In Option 1 network jitter for a particular packet is calculated using information with respect to a reference packet. Thus, assuming packet 2 is the reference packet as illustrated in FIG. 14, jitter j3 of packet 3 is calculated using information with respect to the reference packet 2, jitter j4 of packet 4 is calculated using information with respect to the reference packet 2, and jitter j5 of packet 5 is calculated using information with respect to the reference packet 2.

According to the second method of Option 1 as illustrated in FIG. 14, if it is assumed that jitter j3=2, jitter j4=3 and jitter j5=−1, then prior to packet 5 N_jitter_min=2 and N_jitter_max=3, whereas at packet 5 N_jitter_min=−1 and N_jitter_max=3. Thus, maximum (Max) network jitter at packet 5=N_jitter_max−N_jitter_min=4. Accordingly, Max_network_jitter for packet 5 is 4. The equations for calculating network jitter according to the method of Option 1 and a description thereof are set forth below.

The network jitter of a current packet is calculated according to the method of Option 1 as follows:

N_jitter (Current_header, RFH)=(T_current−T_RFH)−(p_TS_current−p_TS_RFH);

Update N_jitter_max and N_jitter_min, where N_jitter_max is defined as Max {N_jitter(j, RFH)}, for all headers j sent since RFH and including RFH. N_jitter_min is defined as Min {N_jitter(j, RFH)}, for all headers j sent since RFH and including RFH; and Calculate Max_network_jitter=(N_jitter_max−N_jitter_min).

It should be noted that N_jitter_max and N_jitter_min can be positive or negative, but (N_jitter_max−N_jitter_min) is positive.

Option 2:

The steps used to calculate network jitter for the third method of Option 2 are illustrated in FIG. 15. In Option 2, network jitter at a particular packet is calculated using jitter calculations between the packet of interest and each of a predetermined number of preceding packets. The predetermined number of preceding packets is defined as a window and such window can be of any value. In the example illustrated in FIG. 15, the window has a value of 4 preceding packets. The window could be set at any other value such as, for example, 7 packets. Further, the window could, for example, be set to be a value equal to the number of packets since the last reference packet.

As illustrated in FIG. 15, network jitter for packet 5 is calculated using information with respect to packet 1 j(5, −1), packet 2, j(5, 2), packet 3 j(5, 3) and packet 4, j(5, 4). As illustrated in FIG. 15, if the network jitter calculated for packet 5 with respect to each of packet 1 is j(5,1)=−2, packet 2 is j(5,2)=3, packet 3 is j(5,3)=4, and packet 4 is j(5,4)=7, then the max_network_jitter=7. The equations for calculating network jitter according to the third method of Option 2 and a description thereof are set forth below.

The network jitter of a current packet is calculated according to the method of Option 2 as follows:

Calculated N_jitter(Current_header, j)=(T_current−T_j) (p_TS_current−p_TS_j) for all headers j sent before the current header, and belonging to a window W, where T_j is the timer value when header j was received, and p_TS_j is the packed RTP TS of header j; and Calculate Max_network_jitter=|Max N_jitter(Current_header, j)|over all j in the window W.

In the case where a feedback from the decompressor is available, the window W includes headers sent since the last header know to be correctly received (e.g., acknowledged).

In the case of no feedback, the window W includes the last L headers sent, where L is a parameter.

2. Decompressor

To decompress RTP TS of Current_header, the receiver calculates the time elapsed since the Last_header was received, in units of T msec. That time, Timer (Current_header, Last_header) is added to p_TS_last, to give an approximation of p_TS_current. The receiver then determines the exact value of p_TS_current by choosing the value closest to the approximation, whose k least significant bits match the compressed RTP TS. TS_current is then calculated as TS0+(p_TS_current)*TS-stride.

Timer(Current_header, Last_header) can be calculated as (T_current−T_last), where T_current and T_last are the values of R_Timer when Current_header and Last_header were received respectively.

3. Proof of Correctness

In order to prove corrections of the timer and reference based scheme the following is assumed:

Approx_TS is the approximation of p_TS_current, calculated by the decompressor as p_TS_last+Timer (Current_header, Last_header); and Exact_TS is the exact value of p_TS_current.

Based on the above then:

|Approx_TS_Exact_TS|<=|Jitter(Current_header, Last_header)|;

Due to the definition of Max_network_jitter at the compressor:

|Jitter(Current_header, Last_header)|≦J1,

Where J1=Max_network_jitter+Max_radio_jitter+J.

J is a factor added to account for the quantization error caused by the Timers at the compressor and decompressor, which can be +1 or −1. Therefore, J=2 is sufficient.

Thus, it follows that:

|Approx_TS-Exact_TS|≦J1

To calculate the Exact_TS without ambiguity, it is sufficient to choose k such that the condition of $(2*J1+1)<2^k$ is satisfied.

4. Case of Packet Misordering Before the Compressor

Packet Misordering can be detected by a decreasing RTP sequence number (RTP SN). When that happens, the compressor can encode the packed RTP TS using a different scheme, for example, VLE. The decompressor is notified of the different encoding by appropriate indicator bits in the compressed header.

Another option is to apply the normal Timer and Reference Based Scheme algorithm—Misordering will likely result in a larger value of k.

5. Uplink

In wireless systems, for the uplink direction, the network jitter is zero (since both the RTP source and the compressor are located in the wireless terminal), and the radio jitter is normally bounded and controlled to remain very small. Therefore, the expected k will be very small and constant, which minimizes the header size fluctuation. This is a very significant advantage for bandwidth management, since for the uplink, the terminal usually has to request for increased bandwidth from the network. Furthermore, there is no packet misordering. Consequently, the timer based scheme is extremely well suited for the uplink.

6. Downlink

For the downlink direction, the network jitter is not zero, but the overall jitter is normally small to meet the real-time requirements. The expected k will still be small and usually constant. There may be more fluctuation in k, but the bandwidth management is less of an issue, since the network controls the bandwidth allocation.

7. Handoff

In cellular systems, there is a MS-to-network radio link and network-to-MS radio link, denoted uplink and downlink respectively. When compression/decompression is applied to cellular links, there is an MS-based function, MS_AD (MS adaptor), which does compression and decompression for the uplink and downlink respectively. There is a network-based entity, called ANI_AD (access network infrastructure adaptor) that does decompression and compression for uplink and downlink respectively.

The specific case of handoff to consider is inter-ANI_AD handoff, where there may be a disruption caused by switching from the old ANI_AD to a new ANI_AD. The issue is how to maintain continuity of information through the handoff so that after handoff, the compression/decompression at MS_AD and the new ANI_AD continue without disruption.

There are two alternative methods for handoff, described below:

a. First Method

The first method uses the scheme of taking a snapshot of context information exchanged between the ANI_AD and MS_AD, with the handshake method, as disclosed in the related application Ser. No. 09/522,497, filed on the same date as the present application for "AN EFFICIENT HANDOFF PROCEDURE FOR HEADER COMPRESSION" by K. Le. For the RTP TS, the context information contains the full RTP TS of a reference header. Right after handoff, the compressors (MS_AD for uplink and ANI_AD for downlink) temporarily discontinue using the timer-based scheme and send a compressed RTP TS with respect to the reference value. For example, VLE encoding as disclosed in the related application Ser. No. 09/522,497, filed on the same date as the present application for "AN EFFICIENT HANDOFF PROCEDURE FOR HEADER COMPRESSION" by K. Le could be used. Once an acknowledgement has been received, the compressor uses the acknowledged value as the RFH, and switches back to the timer-based scheme.

b. Second Method

The second method keeps using the timer-based scheme across the handoff.

1. Downlink

There is no discontinuity on the receiver side, which is the MS. The compressor's role is transferred from one ANI-AD to another. After handoff, the headers are routed on a new path going through the new ANI_AD instead of the old ANI_AD.

Compressor

The old ANI_AD transfers to the new ANI_AD a snapshot of the following information: T_RFH, p_TS_RFH, current value of S_Timer, TS0, and TS_stride, using the handshake method. (The snapshot values will be denoted with a star, e.g., T_RFH*). The new ANI_AD initializes its S_Timer with the current value of S-timer received from the old ANI_AD and starts incrementing that timer every T msec. Initialization of the S_timer with the current S_timer value of the old ANI_AD is a conceptual description. If there is a singe S_timer shared by multiple flows, the actual S_timer is not reinitialized. Rather, the offset between that S_timer and the value from the old ANI_AD is recorded. The offset is taken into account in future calculations. To compress the very first header after handoff, the new ANI_AD sends the k least significant bits of p_TS_current. The new ANI_AD determines k, the number of bits to be used, as follows:

J2=Upper bound of N_jitter(Current_header, RFH*)+ Max_radio_jitter+J,

Where k is selected to satisfy a condition of $(2*J2+1)<2^k$.

In the above, Max_radio_jitter is the maximum jitter on the segment between the new ANI_AD and the MS-AD.

An Upper bound of N_jitter(Current_header, RFH*) is calculated as follows:

|Timer(Current_header, RFH*)−(p_TS_current−p_TS_RFH*)|+T_transfer, where Timer(Current_header, RFH*) is (T_current−T_RFH*);

T_current is the value of S_Timer at the new ANI_AD when Current_header was received;

T-RFH* is the value received from the old ANI_AD;

T_transfer is an upper bound of the time to transfer the context information from old ANI_AD to new ANI_AD, expressed in units of T msec; and

J=2.

Decompressor

To decompress RTP TS of Current_header, the receiver calculates the time elapsed since RFH was received, in units of T msec. That time, Timer(Current_header, RFH), is added to p_TS_RFH, to give an approximation of p_TS_current. The receiver then determines the exact value of p_TS_current by choosing the value closest to the approximation, whose k least significant bits match the compressed RTP TS. TS_current is then calculated as TS0+(p_TS_current)*TS_stride.

The time elapsed since RFH was received can be calculated as (T_current-T_RFH).

Failure case

When the context information cannot be transferred to the new ANI_AD in a timely manner, the new ANI_AD will send the ful RTP TS until an acknowledgment is received.

ii. Uplink

The decompressor role is transferred from one ANI_AD to another. The compressor stays anchored at the MS.

Decompressor

The old ANI_AD transfers to the new ANI_AD a snapshot of the following information: T_RFH*, p_TS_RFH*, current value of R_Timer*, TS0, and TS_stride, using the handshake method. The new ANI_AD initializes its R_Timer with current value of R_Timer received from the old ANI_AD² and starts incrementing that timer every T msec. Initialization of the R_timer with the current R_timer value of the old ANI_AD is just a conceptual description. If there is a single R_timer shared by multiple flows, the actual R_timer is not reinitialized. Rather, the offset between that R_timer and the value from the old ANI_AD is recorded. That offset is taken into account in future calculations. To decompress the very first header after handoff, the new ANI_AD calculates Timer(Current_header, RFH) adds it to p_TS_RFH*, to give an approximation of p-TS-current. The receiver then determines the exact value to p_TS_current by choosing the value closest to the approximation, whose k least significant bits match the compressed RTP TS. TS_current is then calculated as TS0+(p_TS_current)*TS_stride.

Timer(Current_header, RFH) can be estimated as (T_current-T_RFH*). T_current is the value of R_Timer when Current_header was received.

Compressor

The MS_AD sends the k least significant bits of p-TS_current. It determines k, the number of bits to be used, as follows:

Calculate J2=Upper bound of N_jitter(Current_header, RFH*)+Max_radio_jitter+J,

When k is selected to satisfy a condition of $(2*J2+1)<2^k$.

Here Max_radio_jitter is the maximum jitter on the segment between the new ANI_AD and the MS_AD.

Upper bound of N_jitter(Current_header, RFH*) is calculated as |Timer(Current_header, RFH*)−(p_TS_current_header-p_TS_RFH*)|+T_transfer, where Timer(Current_header, RFH*) is (T_current-T_RFH*);

T_current is the value of S_Timer at the new ANI_AD when Current header was received;

T_RFH* is the value received from the old ANI_AD;

T_transfer is an upper bound of the time to transfer the context information from old ANI_AD to new ANI_AD, expressed in units of T msec; and

J=2

Failure Case

When the context information cannot be transferred to the new ANI_AD in a timely manner, the new ANI_AD will notify the MS_AD, which sends the full RTP TS until an acknowledgment is received.

8. Performance of the Scheme

Due to the conversational real-time requirements, the cumulative jitter in normal operation is expected to be at most only a few times T msec. Therefore, a value of k around 4 or 5 is sufficient, as a jitter of up to 16 to 32 speech samples can be corrected.

The advantages of this scheme are as follows:

The size of the compressed header is constant and small. The compressed header typically includes a message type, which indicates the type of message (k1 bits), a bit mask which indicates which field are changing, and a field that contains the k least significant bits of index_current (k bits). Assuming that 4-bit MSTI bit mask is used, and k1=4, the size of compressed header when only the RTP TS changes (this case is by far the most frequent) is 1.5 bytes. Furthermore, the size does not change as a function of the length of interval of silence.

No synchronization is required between the timer process and the decompressor process.

Robustness to errors, as the partial RTP TS information in the compressed header is self contained and only needs to be combined with the receiver timer to yield the full RTP TS value. Loss or corruption of a header will not invalidate subsequent compressed headers.

The compressor needs to maintain little memory information:

T_RFH, p-TS_RFH, N_jitter_max, N_jitter_min, TS0, and TS_stride in Option 1 and

{T-j, p-TS-j}, for all j in window W, TS0, and TS-stride in Option 2.

C. Jitter Reduction

Due to the conversational real-time requirements, one can reasonably expect that the various jitters described above are on the order of a few T msec's in normal operation. However, one cannot rule out cases where the jitter is larger and would therefore require a larger k. For example, there can be abnormal conditions on the path from the RTP source to the receiver (failures, etc.), during which jitters become excessive. Also, there may be cases where a constant value of k is desired or desirable. To deal with these cases, a jitter reduction function can be implemented as a front end to the compressor to filter out packets with excessive jitter (i.e., jitter exceeding some threshold value).

In the stationary case (no handoff), the jitter is calculated as J1 and compared to a stationary threshold as follows:

J1=(n_jitter_max-N_jitter_min)+Max_radio_jitter+J.

In the handoff case, the jitter is calculated as J2 and compared to a handoff threshold as follows:

J2=|Timer(Current_header, RFH*)−(p_TS-current−p_TS_RFH*)|+T_transfer+Max_radio_jitter+J.

The main difference with respect to the stationary no-handoff case, is the addition of T_transfer. In practice, to be able to execute handoff in 100 msec, T_transfer must be bounded by about 100 msec, so T_transfer=about 5 or 6 in units of T msec (T=20 msec). A value of k=5 is sufficient.

The stationary and handoff thresholds may or may not be the same.

D. Case of Video

In the case of an RTP video source, it is not necessarily true that there is a constant time spacing between packets, and furthermore, the RTP TS does not necessarily increment by a constant stride from one packet to the next. However, the RTP TS and time spacing between packets are discrete. Thus, as follows:

RTP time stamp of packet m=RTP time stamp of packet 0 (generated at time 0)+TS_stride*[index+adjust(m)], where TS_stride is a constant dependent on the codec, and adjust(m) is an integer that depends on m and reflects the differences with respect to a linear behavior like in voice; and the time spacing between two consecutive packets is an integer multiple of T msec.

In what follows, that behavior at the RTP source is referred to as adjusted linear behavior. Using the same notation as for voice, TS_last=TS0+TS+stride*[index_last+adjust (index_last)], and TS_current=TS0+TS_stride*[index_current)+adjust (index-current]. The Adjust parameter can be positive or negative. Thus, the main difference compared to voice is the additional term Adjust.

The RTP TS is headers coming into the decompressor also follow an adjusted linear pattern as a function of time, but less closely, due to the delay jitter between the source and the decompressor. In normal operation (absence of crashes or failures), the delay jitter is bounded, to meet the requirements of conversational real-time traffic.

As above it is assumed that the packed RTP TS of Current_header=index_current+adjust(index_current). The same notation will be used with respect to p_TS_current, for example, Compressor The compressor sends in the compressed header the k least significant bits of p_TS_current. The algorithm to determine k is the same as for voice.

Decompressor

The algorithm to be used is the same as for voice.

1. Handoff

The two alternative methods for handoff described for voice, apply as well to video.

2. Value of k

For voice, it was shown that k=4 or 5 is sufficient ($2^k=16$ or 32). In the case of video, a larger value of k is required due to Adjust. Since the video is structured in 30 frames per second, |Adjusti|<30. Therefore, k=7 or 8 bits should be sufficient in normal operation.

Several embodiments of the present invention are specifically illustrated and/or described herein. However, it will be appreciated that modifications and variations of the present invention are covered by the above teachings and within the purview of the appended claims without departing from the spirit and intended scope of the invention.

While the present invention has been described in detail and pictorially in the accompanying drawings it is not limited to such details since many changes and modifications recognizable to those of ordinary skill in the art may be made to the invention without departing from the spirit and the scope thereof.

What is claimed is:

1. A method of transmitting in a network between a source and a receiver a current header field of a current packet using a timer-based compression technique, comprising:
   providing from a compressor to a decompressor an initial value of a header field;
   calculating at the compressor a compressed header field of the current packet based on the current header field of the current packet and jitter,
   wherein said calculating step comprises the steps of:
      calculating a jitter effect the network between a source and said decompressor has on the transmission of packets, and
      calculating the compressed header field as a portion of a field value, said portion being a function of jitter;
      receiving the compressed header field of the current packet at the decompressor;
      estimating the header field of the current packet based on elapsed time at the decompressor between reception of the compressed header field of the current packet and reception of a header field of a previous packet which was decompressed and a decompressed field value of the previous packet; and
      correcting the estimated current header field based on the compressed header field received at the decompressor.

2. A method according to claim 1, wherein said calculating a jitter effect comprises the steps of:
   calculating a jitter effect of the network before the compressor; and
   calculating a jitter effect of the network between the compressor and decompressor.

3. A method according to claim 2, wherein said jitter effect of the network between the compressor and decompressor is set to an upper bound value for jitter.

4. A method according to claim 2, wherein said calculating a jitter effect of the network before the compressor comprises:
   calculating jitter effect of a current packet using information with respect to a reference packet.

5. A method according to claim 2, wherein said calculating a jitter effect of the network before the compressor comprises:
   calculating jitter effect of a current packet using information with respect to said current packet and each of a predetermined number of preceding packets.

6. A method according to claim 2, wherein said calculating a jitter effect of the network before the compressor comprises:
   calculating jitter effect of a current packet using information with respect to said current packet and each preceding packet up to a reference packet.

7. A method according to claim 1, wherein said calculating at the compressor the compressed header field of the current packet comprises:
   calculating the compressed header field of the current packet as the least significant k bits of the field value, where k is an integer.

8. A method of claim 1, wherein said header field comprises a time stamp.

9. A method of claim 1, wherein said header field comprises an RTP time stamp.

10. A method according to claim 1, wherein said calculating at the compressor the compressed header field of the current packet comprises:

converting the field value into another value, referred to as a packed value, which takes fewer bits to represent; and calculating the compressed header field of the current packet as the least significant k bits of the packed value, where k is an integer.

11. A method of decompressing a current header field of a current packet transmitted in a network from a compressor to a decompressor comprising the steps of:

receiving a compressed header field of a current packet at the decompressor, said compressed header field having been calculated at the compressor as a portion of a field value which is calculated as a jitter effect the network between a source and the decompressor has on the transmission of packets;

calculating an approximation of the header field of the current packet at the decompressor based on elapsed time since arrival of a previous compressed header field at the decompressor and a decompressed field value of the previous packet;

calculating a header field correction amount for the current packet at the decompressor based upon the compressed header field of the current packet; and decompressing the compressed header field of the current packet at the decompressor by adjusting the approximation of the header field of the current packet an amount based upon the header field correction amount.

12. A method according to claim 11, wherein said jitter effect the network between the source and the decompressor has on the transmission of packets is calculated by calculating a jitter effect of the network between the compressor and calculating a jitter effect of the network between the compressor and decompressor.

13. A method according to claim 12, wherein said jitter effect of the network between the compressor and decompressor is set to an upper bound value for jitter.

14. A method according to claim 12, wherein said calculating a jitter effect of the network before the compressor comprises:

calculating jitter effect of a current packet using information with respect to a reference packet.

15. A method according to claim 12, wherein said calculating a jitter effect of the network before the compressor comprises:

calculating jitter effect of a current packet using information with respect to said current packet and each of a predetermined number of preceding packets.

16. A method according to claim 12, wherein said calculating a jitter effect of the network before the compressor comprises:

calculating jitter effect of a current packet using information with respect to said current packet and each preceding packet up to a reference packet.

17. A method according to claim 11, wherein the compressed header field is calculated as the least significant k bits of the field value, where k is an integer.

18. A method according to claim 11, wherein the compressed header field is calculated as the least significant k bits of a packed value, where k is an integer; and wherein the decompressor calculates an approximation of the packed value based on time elapsed since arrival of a previous packet and a decompressor packed value of the previous packet.

19. A method of performing a handoff between first and second network entities in a system, the first and second network entities interfacing a mobile decompressor to a source terminal when the mobile decompressor is located in first and second areas, respectively, the method comprising:

receiving an initial value of a header field at the first network entity and at the mobile decompressor from a source terminal, the first network entity interfacing the mobile decompressor, located in a first area, to a source terminal;

receiving a header field of a first packet that is addressed to the mobile decompressor at the first network entity from the source terminal;

compressing the header field of the first packet at the first network entity and sending a first compressed header field of the first packet to the mobile decompressor, said first compressed header field being calculated as a portion of a field value which is calculated as a first jitter effect the network between the source terminal and the mobile decompressor has on the transmission of packets;

receiving and decompressing the first compressed header field of the first packet at the mobile decompressor based on time elapsed since arrival of a previous packet and decompressed field value of the previous packet;

the mobile decompressor moving from the first area to the second area;

transmitting the initialization information to the second network entity to initialize the second network entity for compression;

receiving and compressing, at the second network entity, a header field of a second packet from the source terminal that is addressed to the mobile decompressor, and sending a second compressed header field of the second packet to the mobile decompressor, said second compressed header field being calculated as a portion of a field value which is calculated as a second jitter effect the network between the source terminal and the mobile decompressor has on transmission of packets and the time to transmit the initialization information to the second network entity; and receiving and decompressing the second compressed header field of the second packet at the mobile decompressor based on time elapsed since arrival of a previous packet and decompressed field value of the previous packet.

20. A method according to claim 15, wherein each of said first and second jitter effect the network between the source terminal and the decompressor has on the transmission of packets is calculated by calculating a jitter effect of the network before the compressor, and calculating a jitter effect of the network between the compressor and decompressor.

21. A method according to claim 20, wherein said jitter effect of the network between the compressor and decompressor is set to an upper bound value for jitter.

22. A method according to claim 19, wherein said first packet is a packet immediately preceding handoff and said second packet is a packet immediately succeeding handoff.

23. A method according to claim 20, wherein said calculating a jitter effect of the network before the compressor comprises:

calculating jitter effect of a current packet using information with respect to a reference packet.

24. A method according to claim 20, wherein said calculating a jitter effect of the network before the compressor comprises:

calculating jitter effect of a current packet using information with respect to said current packet and each of a predetermined number of preceding packets.

25. A method according to claim 20, wherein said calculating a jitter effect of the network before the compressor comprises:

calculating jitter effect of a current packet using information with respect to said current packet and each preceding packet up to a reference packet.

26. A method according to claim 19, wherein said header field comprises a time stamp.

27. A method according to claim 19, wherein the compressed header field is calculated as the least significant k bits of the field value, where k is an integer.

28. A method according to claim 19, wherein the compressed header field is calculated as the least significant k bits of a packed value, where k is an integer; and wherein the decompressor calculates an approximation of the packed value based on time elapsed since arrival of a previous packet and a decompressor packed value of the previous packet.

29. A method of performing a handoff between first and second network entities, the first and second network entities interfacing a mobile compressor to a receiver terminal when the mobile compressor is located in first and second areas, respectively, the method comprising:

receiving an initial value of a header field at a first network entity from a mobile compressor;

receiving in the first network entity, a first compressed header field of a first packet received from the mobile compressor, said first compressed header field having been calculated at the mobile compressor as a portion of a field value which is calculated as a first jitter effect the network between a source and a decompressor has on transmission of packets;

decompressing, in the first network entity, the first compressed header field of the first packet based upon the time elapsed since arrival of a previous packet and decompressed field value of the previous packet;

the mobile compressor moving from the first area to the second area;

sending initialization information to the second network entity to initialize the second network entity for compression;

receiving, in the second network entity, a second compressed header field of a second packet received from the mobile compressor, said second compressed header field having been calculated at the mobile compressor as a portion of a field value which is calculated as a second jitter effect the network between the source and the decompressor has on transmission of packets and the time to transmit the initialization information to the second network entity; and decompressing, at the second network entity, the second compressed header field of the second packet based upon the time elapsed since arrival of a previous packet and decompressed field value of the previous packet.

30. A method according to claim 29, wherein said first and second jitter effect the network between the source and the decompressor has on the transmission of packets is calculated by calculating a jitter effect of the network before the mobile compressor, and calculating a jitter effect of the network between the compressor and decompressor.

31. A method according to claim 30, wherein said jitter effect of the network between the compressor and decompressor is set to an upper bound value for jitter.

32. A method according to claim 29, wherein said first packet is a packet immediately preceding handoff and said second packet is a packet immediately succeeding handoff.

33. A method according to claim 30, wherein said calculating a jitter effect of the network before the mobile compressor comprises:

calculating jitter effect of a current packet using information with respect to a reference packet.

34. A method according to claim 30, wherein said calculating a jitter effect of the network before the mobile compressor comprises:

calculating jitter effect of a current packet using information with respect to said current packet and each of a predetermined number of preceding packets.

35. A method according to claim 30, wherein said calculating a jitter effect of the network before the mobile compressor comprises:

calculating jitter effect of a current packet using information with respect to said current packet and each preceding packet up to a reference packet.

36. A method according to claim 29, wherein said header field comprises a time stamp.

37. A method according to claim 29, wherein the compressed header field is calculated as the least significant k bits of a packed value, where k is an integer; and wherein the decompressor calculates an approximation of the packed value based on time elapsed since arrival of a previous packet and a decompressor packed value of the previous packet.

38. A method according to claim 29, wherein the compressed header field is calculated as the least significant k bits of the field value, where k is an integer.

39. A communication system comprising:

a source providing a plurality of packets, each packet including a header field, the source being coupled to a network;

a receiver including a decompressor;

a network entity coupled to the network and to the receiver by a network between the network entity and the receiver, the network entity including a compressor for performing header field compression for at least some of the packets sent from the source and directed to the receiver, the network entity including a jitter reduction function for calculating jitter in the packets directed to the receiver terminal and discarding packets having a jitter that is greater than a predetermined value, wherein the jitter is calculated as a total of an amount of jitter caused by the network between the source and the decompressor included in the receiver.

40. A communication system according to claim 39, wherein said jitter is calculated by calculating a jitter effect of the network before the compressor, and calculating a jitter effect of the network between the compressor and decompressor.

41. A communication system according to claim 39, wherein said jitter effect of the network between the compressor and decompressor is set to an upper bound value for jitter.

42. A communication system according to claim 40, wherein said a jitter of the network before the compressor is calculated by calculating jitter effect of a current packet using information with respect to a reference packet.

43. A communication system according to claim 40, wherein said calculating a jitter effect of the network before the compressor comprises:

calculating jitter effect of a current packet using information with respect to said current packet and each of a predetermined number of preceding packets.

44. A communication system according to claim 40, wherein said calculating a jitter effect of the network before the compressor comprises:

calculating jitter effect of a current packet using information with respect to said current packet and each preceding packets up to a reference packet.

45. A communication system according to claim 39, wherein the compressed header field is calculated as the least significant k bits of a packed value, where k is an integer; and wherein the decompressor calculates an approximation of the packed value based on time elapsed since arrival of a previous packet and a decompressor packed value of the previous packet.

\* \* \* \* \*